US010366017B2

(12) United States Patent
Abramson et al.

(10) Patent No.: US 10,366,017 B2
(45) Date of Patent: Jul. 30, 2019

(54) METHODS AND APPARATUS TO OFFLOAD MEDIA STREAMS IN HOST DEVICES

(71) Applicant: Intel Corporation, Santa Clara, CA (US)

(72) Inventors: Darren Abramson, Folsom, CA (US); David Hines, Cameron Park, CA (US); Alberto Martinez, El Dorado Hills, CA (US); Adeel Aslam, Folsom, CA (US); John Howard, Hillsboro, OR (US); Shanthanand R. Kutuva, Folsom, CA (US); Karthi R. Vadivelu, Folsom, CA (US); Kar Leong Wong, Folsom, CA (US); Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/941,273

(22) Filed: Mar. 30, 2018

(65) Prior Publication Data

US 2019/0042483 A1 Feb. 7, 2019

(51) Int. Cl.
*G06F 13/38* (2006.01)
*G06F 13/10* (2006.01)
*G06F 3/06* (2006.01)

(52) U.S. Cl.
CPC .......... *G06F 13/102* (2013.01); *G06F 13/385* (2013.01); *G06F 2209/509* (2013.01); *G06F 2213/0042* (2013.01)

(58) Field of Classification Search
None
See application file for complete search history.

(56) References Cited

U.S. PATENT DOCUMENTS

| 5,408,605 | A | 4/1995 | Deering |
| 8,161,212 | B1 | 4/2012 | Lu et al. |
| 2006/0037072 | A1 | 2/2006 | Rao et al. |

(Continued)

OTHER PUBLICATIONS

Murphy, R., "USB 101: An Introduction to Universal Serial Bus 2.0", Document No. 001-57294, Rev. *H, Cypress Semiconductor Corporation, 2017, 57 pages.

*Primary Examiner* — Scott C Sun
(74) *Attorney, Agent, or Firm* — Hanley, Flight & Zimmerman, LLC

(57) ABSTRACT

An example apparatus includes: a host controller offload capability detector to determine that a media stream offload capability is available in the peripheral interface host controller; a media stream offload arbiter to send a media stream offload request to a media processor manager based on the media stream offload capability and based on a peripheral device being connected to the peripheral interface host controller; and an endpoint mapper to generate an endpoint table entry corresponding to the peripheral device, the endpoint table entry to assign a first communication interface of the peripheral interface host controller to transfer a media stream corresponding to the peripheral device between the media processor and the peripheral interface host controller without the media stream being routed to an application processor that is in circuit with the peripheral interface host controller and in circuit with the media processor.

25 Claims, 9 Drawing Sheets

(56) References Cited

U.S. PATENT DOCUMENTS

| | | |
|---|---|---|
| 2009/0214051 A1* | 8/2009 | Lockett .................. H04N 7/163 |
| | | 381/77 |
| 2010/0042239 A1 | 2/2010 | Moore et al. |
| 2010/0325299 A1 | 12/2010 | Rao et al. |
| 2012/0131309 A1 | 5/2012 | Johnson et al. |
| 2013/0007375 A1 | 1/2013 | Auernhammer et al. |
| 2013/0166874 A1 | 6/2013 | Auemhammer et al. |
| 2015/0248595 A1* | 9/2015 | Khan .................. G06K 9/00771 |
| | | 382/105 |
| 2017/0212724 A1 | 7/2017 | Howard et al. |
| 2018/0181364 A1* | 6/2018 | Gupta ..................... G06F 3/162 |

* cited by examiner

MEDIA STREAM OFFLOAD TRANSFER PHASE

| I/O PIN NUMBER | PERIPHERAL INTERFACE ENDPOINT ADDRESS | DEVICE SLOT NUMBER | SPLIT EP | VALID |
|---|---|---|---|---|
| 1 | 2 | 1 | 0 | 1 |
| 5 | 17 | 4 | 1 | 1 |

ENDPOINT MAPPING TABLE

METHODS AND APPARATUS TO OFFLOAD MEDIA STREAMS IN HOST DEVICES

FIELD OF THE DISCLOSURE

This disclosure is generally about media processing systems, and more specifically about methods and apparatus to offload media streams in host devices.

BACKGROUND

Media devices and electronic devices having media playback and/or record capabilities use media interfaces to emit, present, and/or record media. Audio interfaces include headphone interfaces, speaker interfaces, audio line-out/line-in interfaces, and microphone interfaces for audio streams processed by media devices. Media interfaces for other types of media such as video, images, etc. operate in similar manners. Media interfaces can be placed in circuit with application processors, digital signal processors, and/or media codecs, which process media to be emitted, presented, and/or transmitted via media output interfaces.

BRIEF DESCRIPTION OF THE DRAWINGS

FIG. 6 illustrates an example endpoint mapping table of the peripheral interface host controllers of FIGS. 1-3 and 5.

Figure 1:
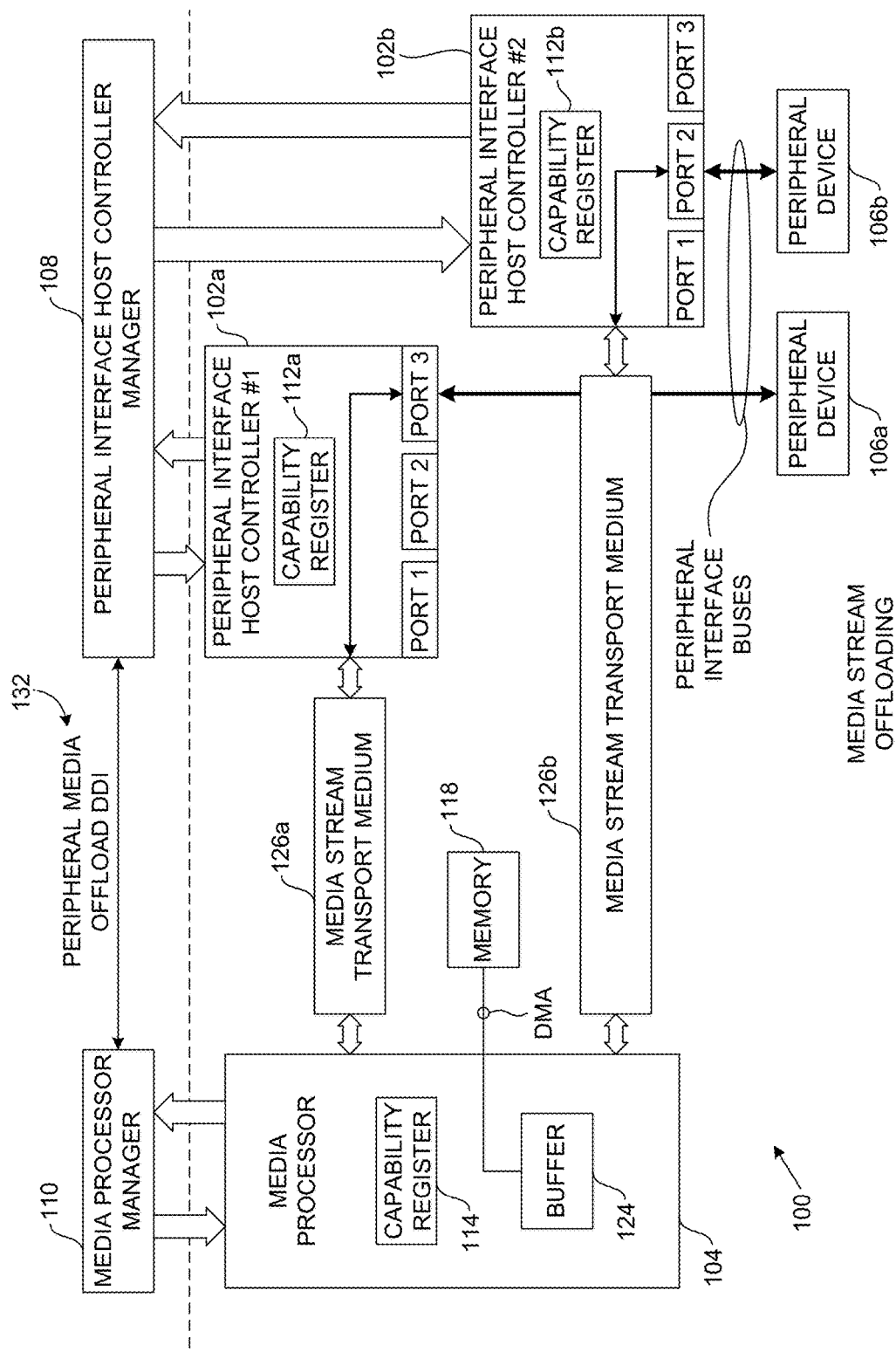
FIG. 1 depicts an example host device to perform media stream offloading between a media processor and a peripheral interface host controller in accordance with teachings of this disclosure.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Examples disclosed herein enable host devices to handle media streams corresponding to peripheral devices in a more efficient manner than prior techniques by routing media streams between peripheral interface host controllers and media processors instead of processing the media streams using application processors. Examples disclosed herein may be used with different types of media streams including audio streams and/or video streams. Example host devices in which examples disclosed herein may be implemented include mobile communication/media devices (e.g., mobile smartphones, mobile media devices, tablet computing devices, wearable computing devices (e.g., smartwatches), etc.), desktop computers, laptop/notebook computers, internet appliances, home entertainment devices, automobiles, and other types of host devices.

As used herein, a "peripheral device" is an auxiliary device that is plugged in or connected to a host device. In some examples, the peripheral device communicates with the host device using digital information transferred across analog signals via a connection interface (e.g., a physical interface cable, physical connectors, a wireless connection, etc.). The peripheral device and the host device may sample the analog signals to extract the digital information, and process the digital information to encode, decode, playback, store (e.g., record) a media stream. In some examples, the digital information includes control data to control media stream handling at the host device and/or the peripheral device. Example types of peripheral device interfaces include universal serial bus (USB) interfaces, Thunderbolt™ interfaces, etc. Peripheral devices may be output devices that receive media streams from host devices. In some examples, such output peripheral devices are intended for presentation of the media streams to users and may be implemented using speakers, headsets, headphones, displays, radio frequency (RF) transmitters (e.g., Bluetooth® wireless transmitters), etc. Peripheral devices may also be input devices that provide media streams to host devices such as microphones, cameras, RF receivers (e.g., Bluetooth® wireless receivers), etc.

To enable interfacing with peripheral devices, host devices in which examples disclosed herein may be implemented are provided with host controllers. A host controller manages the detection of connected peripheral devices. Examples disclosed herein may be used with different types of peripheral interface controllers including USB host controllers, Thunderbolt™ interface controllers, etc.

Host devices in which examples disclosed herein may be implemented include an application processor (e.g., a central processing unit (CPU)) and a media processor. In such host devices, the application processor may be implemented using an Intel® processor, an ARM® processor, and/or any other type of processor. Application processors in host devices are typically configured to execute an operating system (OS), applications, system control processes, etc., and may also perform media processing. However, when performing media processing, many application processors are less efficient than dedicated media processors because application processors lack the media-specific circuits and/or features for decoding, encoding, and/or otherwise processing media in a time-efficient and power-efficient manner. In examples disclosed herein, media processing in a host device is offloaded to a media processor instead of performing such processing in an application processor. Example types of media processors include hardware accelerators, instruction execution-based accelerators, and/or any other type of media processing accelerator (e.g., digital signal processors (DSPs), application-specific integrated circuits (ASICs), multimedia co-processors, audio processors, video processors, audio codecs, video codes, etc.).

In prior audio designs, audio streams were primarily routed through 3.5 mm analog audio jacks and these audio streams were offloaded and processed in an audio DSP on platforms that were configured with such a dedicated audio processing component. This allowed the application processor to enter deeper sleep states for longer periods of time while audio streams such as low-power music playback were active on the audio DSP.

Prior audio designs have evolved to use DSP-based audio controllers for hardware acceleration only for media routed through traditional audio interfaces (e.g., 3.5 mm analog audio jacks) and not through USB or other peripheral interface host controller over which digital data is communicated. However, many manufacturers have started turning to the USB peripheral device interface standard as a peripheral interface technology for handling media stream transfers between host devices and peripheral devices. For example, the USB Type-C port provides a significant advantage over a 3.5 mm analog audio jack in that the USB Type-C port enables a single connector port to handle display peripherals, audio peripherals, human interface device (HID) peripherals, storage peripherals, and power supplies. As such, industry adoption of USB Type-C port for headsets, speakers and microphones has been increasing in original equipment manufacturer (OEM) platforms. Further, less space in smaller form-factor devices and higher compute requirements in such devices has led to the elimination or decreased use of legacy 3.5 mm analog audio jacks in new devices. This, in turn, is making the USB bus the primary mode of transport for audio streams. Prior technologies process USB-based audio streams in the application processor, which results in significantly higher power consumption for audio stream processing that was previously handled by an audio DSP and routed to a 3.5 mm analog audio jack.

The USB standard has been implemented in mobile communication/media devices, desktop computers, laptop/notebook computers, tablet computing devices, internet appliances, home entertainment devices, automobiles, and other types of host devices to transfer media streams to and from USB peripheral devices. In the audio stream context, prior USB host devices route USB-based audio streams to a USB host controller which then initiates direct memory access (DMA) transfers of the audio streams between an application processor and system memory (e.g., dynamic random access memory (DRAM)). Audio stream processing is then performed by audio software running on an OS on the application processor. This results in significant power consumption during, for example, media playback or voice calls.

The significantly higher power consumption of prior USB-based audio stream handling techniques occurs due to the frequent activation of the data transfer path between memory and the application processor (e.g., every 1 millisecond (ms), which is the typical USB audio transport data rate service interval) and the frequent waking up of the application processor, which incurs additional power consumption (e.g., typically every 10 ms for processing audio streams) to maintain a number of others of its subsystems active (e.g., cache, buses, cores, etc.) when processing audio streams. As such, the overhead involved in waking up the CPU every 10 ms further adds to system power consumption during audio processing.

Examples disclosed herein enable offloading media stream processing to a media processor of a host device instead of such processing being performed by the application processor of the host device. Since media processors are specifically designed for media processing functions, media processors are more power-efficient at processing media than application processors, which are designed to handle a broader variety of functionality including running operating systems, applications, user interfaces, and system control activities. As such, by offloading media stream processing to a media processor, examples disclosed herein consume relatively less power when handling media streams (e.g., media streams originating from or targeting USB-attached peripheral devices) than prior techniques that process media streams using an application processor of a host device.

Prior techniques process a media stream corresponding to a peripheral device by configuring a host device to create a single control and data path for the media stream when the peripheral device is connected to the host device. To implement media stream offloading in accordance with the teachings of this disclosure, examples disclosed herein improve the data path for transferring the media stream by separating the single control and data path of the media stream into two separate paths that include a control path and the separate data path. In examples disclosed herein, the data path for the media stream transfer is improved to reduce power consumption of a host device relative to prior media processing techniques by providing the data path with deep buffering capabilities so that transferring the media stream in the host device incurs less-frequent waking up or activating of a path to memory than prior techniques (e.g., prior techniques that wake up every 1 millisecond for the USB service interval).

Power consumption of a host device is also decreased relative to prior techniques by routing the data path of the media stream to a low-power media processor for processing the media stream. Since media stream processing is performed by a low-power media processor, and the low-power media processor consumes relatively less power than an application processor of the host device, examples disclosed herein enable further reducing power consumption of the host device by decreasing the frequency at which the application processor needs to be awakened when the low-power media processor is processing the media stream. That is, although the application processor may still be awakened to handle control data (e.g., during stream setup, stream termination, and event-driven stream management) corresponding to the media stream, such activities are less frequent than the 10 ms wake-up cycles for processing the media stream as is required when the application processor is included in the data path to process the media stream.

FIG. 1 depicts an example host device 100 to perform media stream offloading between example peripheral interface host controllers 102a, 102b and an example media processor 104. In the illustrated example, media streams may be output media streams that the host controllers 102a,b send to respective connected peripheral devices 106a, 106b, and/or media streams may be input media streams received by the host controllers 102a,b from the peripheral devices 106a,b. Unlike prior techniques that use an application processor of host devices to process media streams (e.g., decode media data, encode media data, compress media data, decompress media data, encrypt media data, decrypt media data, store media data, etc.), in examples disclosed herein, media streams to and/or from the peripheral devices 106a,b are routed through the peripheral interface host controllers 102a,b and between the peripheral interface host controllers 102a,b and the media processor 104 so that the media processor 104 can handle compute-intensive processing of the media stream (e.g., decoding, encoding, compressing, decompressing, encrypting, decrypting, storing, etc.). By offloading the media processing to the media processor 104 instead of handling media streams by an application processor of the host device 100 (e.g., the processor 1012 of the processor platform 1000 of FIG. 10), the media processing is substantially more efficient than prior techniques that use application processors for such media processing. In addition, because an application processor is responsible for handling OS processes, application processes, system control processes, etc. of a host device, adding media processing responsibilities to the application processor introduces latencies for the other processes also handled by the application processor. To eliminate or substantially reduce media processing burden on the application processor, examples disclosed herein offload media processing to the media processor 104 of the illustrated example so that such media processing does not degrade performance of the application processor when handling its other responsibilities. That is, the media processor 104 operates as a hardware accelerator designed to perform computationally intensive algorithms or processes on media data in a fast and efficient manner that otherwise take more time and are performed less efficiently when handled by an application processor. By achieving such higher compute efficiencies and faster media processing times using the media processor 104, examples disclosed herein can be used to decrease power consumption of host devices and enable better media processing capabilities because the media processor 104 implements media processing algorithms in a more power-efficient manner (e.g., consume less power per media processing instruction than an application processor) and a more time-efficient manner (e.g., can process more media data in less time than an application processor) than an application processor.

In the illustrated example of FIG. 1, the peripheral interface host controllers 102a,b may be USB host controllers and/or any other type of host controller to which peripheral devices may be connected for receiving media streams from the host device 100 and/or providing media streams to the host device 100. Although two peripheral interface host controllers 102a,b are shown, examples disclosed herein may be implemented using fewer or more peripheral interface host controllers 102a,b in a host device. In addition, although some examples disclosed herein are described based on both peripheral interface host controllers 102a,b and the corresponding peripheral devices 106a,b connected thereto, such examples may be similarly implemented with a single one of the peripheral interface host controllers 102a,b and a corresponding one of the peripheral devices 106a,b connected thereto. In addition, examples disclosed herein may be performed with more peripheral interface host controllers and more peripheral devices. Further, examples disclosed herein may be implemented in connection with multiple peripheral devices connected to a single peripheral interface host controller 102a,b.

The example media processor 104 may be implemented using a DSP, a media codec, an ASIC, and/or any other type of media processor/hardware accelerator for processing media streams. Although a single media processor 104 is shown, examples disclosed herein may be implemented with multiple media processors. In addition, although the media processor 104 is shown in FIG. 1 as in circuit to both of the peripheral interface host controllers 102a,b, in other examples in which multiple media processors are provided, each of the peripheral interface host controllers 102a,b may be in circuit with a respective one of the media processors.

In the illustrated example, the peripheral interface host controllers 102a,b are in circuit with an example peripheral interface host controller manager 108. Also in the illustrated example, the media processor 104 is in circuit with an example media processor manager 110. In the illustrated example, the peripheral interface host controller manager 108 and the media processor manager 110 are implemented using software executed by an application processor (e.g., the example processor 1012 shown in the example processor platform described below in connection with FIG. 10). For example, the peripheral interface host controller manager 108 may be implemented as a peripheral interface media software/firmware stack (e.g., a USB audio software/firmware stack), and the media processor manager 110 may be implemented as a media software/firmware stack (e.g., an audio video system media software/firmware stack). Also in the illustrated example, the peripheral interface host controllers 102a,b and the media processor 104 are implemented using hardware. However, each of the peripheral interface host controllers 102a,b and the media processor 104 may be provided with respective software and/or firmware that is executable to implement different perspective functionalities. For example, the media processor 104 may execute firmware to implement different media processing algorithms and/or to implement different media stream controls. In addition, the peripheral interface host controllers 102a,b may execute firmware to implement media stream control management and/or to interface with peripheral devices.

In the illustrated example, the peripheral interface host controllers 102a,b are provided with corresponding host controller capability registers 112a, 112b, and the media processor 104 is provided with a media processor capability register 114. The example host controller capability registers 112a,b store media stream offloading capability information indicative of whether the respective peripheral interface host controllers 102a,b are capable of supporting media stream offloading in accordance with teachings of this disclosure. The example media processor capability register 114 stores media stream offloading capability information indicative of whether the media processor 104 is capable of supporting media stream offloading. Each of the example host controller capability registers 112a,b and the example media processor capability register 114 store the offloading capability information in a field of one or more bits in which a value of the one or more bits indicates no media stream offloading capability (e.g., offloading capability value=0) and another value of the one or more bits indicates media stream offloading capability (e.g., offloading capability value=1). In examples disclosed herein, the peripheral interface host controllers 102a,b and the media processor 104 support media stream offloading capabilities when there are physical data path connections between the peripheral interface host controllers 102a,b and the media processor 104 to transfer media stream data therebetween.

In the illustrated example, the host device 100 is provided with example memory 118 to store digital media (e.g., audio, video, images, text, etc.). The example memory 118 is in circuit with the media processor 104 to transfer media streams between the memory 118 and the media processor 104. The example memory 118 may be implemented using any suitable volatile or nonvolatile memory including DRAM, static random access memory (SRAM), a solid state drive (SSD), a magnetic hard disk drive (HDD), an optical disc (e.g., a compact disk (CD), a digital versatile disk (DVD)), 3D flash memory, 3D crosspoint memory, single-threshold or multi-threshold level NAND flash memory, etc. In the illustrated example, the media processor manager 110 configures direct memory access (DMA) transfers of media data between the memory 118 and the media processor 104. To store or buffer media stream data from the memory 118, the media processor 104 is provided with an example data buffer 124 (e.g., SRAM and/or any other memory embedded in the media processor 104, a first-in, first-out (FIFO) buffer, etc.). In the illustrated example, the data buffer 124 is sufficiently large enough to decrease the frequency (e.g., relative to prior media stream transfer techniques) at which the media processor 104 must send access requests to the memory 118 to transfer additional media stream data to and/or from the memory 118.

In the example of FIG. 1, the peripheral interface host controllers 102a,b are in circuit with the media processor 104 via corresponding I/O controllers shown below in FIGS. 2, 3, and 5. In the illustrated example, the I/O controllers of the peripheral interface host controllers 102a,b and the media processor 104 implement example media stream transport mediums 126a, 126b that form a data path for transferring media stream packets between the media processor 104 and the peripheral interface host controllers 102a,b. For example, when the peripheral devices 106a,b connected to the peripheral interface host controllers 102a,b are output devices (e.g., speakers, headsets, headphones, displays, RF transmitters, etc.), the media stream transport mediums 126a,b may be used to transfer output media streams that include media data processed by the media processor 104 for presenting by the peripheral devices 106a,b. When the peripheral devices 106a,b are input devices (e.g., microphones, cameras, RF receivers, etc.), the media stream transport mediums 126a,b may be used to transfer input media streams (e.g., raw data, un-encoded data, encoded data, etc.) to the media processor 104 from the peripheral interface host controllers 102a,b. In such examples, the input media streams are provided to the peripheral interface host controllers 102a,b by the peripheral devices 106a,b. When the peripheral devices 106a,b send control information to the peripheral interface host controllers 102a,b, the peripheral interface host controllers 102a,b separate the control information from media stream data so that the control information can be handled by the peripheral interface host controller manager 108 and the media stream data can be transferred via the media stream transport mediums 126a,b. In the illustrated example, media stream transfers may be transferred across the media stream transport mediums 126a,b by the peripheral interface host controllers 102a,b and the media processor 104 using synchronous transfers, isochronous transfers, bulk transfers, and/or asynchronous transfers.

The example media stream transport mediums 126a,b implement hardware bridges that transfer the media streams between the peripheral interface host controllers 102a,b and the media processor 104. Such hardware bridges reduce power consumption of media stream processing and enable low-power media streaming. Use of the hardware bridges is managed by the example peripheral interface host controller manager 108 and the example media processor manager 110. For example, as shown in FIG. 1, the peripheral interface host controller manager 108 and the media processor manager 110 implement a peripheral media offload driver-to-driver interface (DDI) 132 which forms a control path to enable messaging of control information between the peripheral interface host controller manager 108 and the media processor manager 110. In the illustrated example, the peripheral media offload DDI 132 is used to discover, setup, and/or terminate media stream routing between the peripheral interface host controller 102a,b and the media processor 104. In some examples when used to implement a USB audio offload configuration, the peripheral media offload DDI 132 is a USB audio offload DDI. In some examples when used to implement a USB video offload configuration, the peripheral media offload DDI 132 is a USB video offload DDI. After the peripheral interface host controller manager 108 and the media processor manager 110 setup the peripheral media offload DDI 132 therebetween, media stream traffic flows directly between the peripheral interface host controllers 102a,b and the media processor 104 via the media stream transport mediums 126a,b without needing significant amounts of involvement of an application processor and/or significant amounts of accesses to main memory (e.g., the memory 118) as required by prior media stream transfer techniques. This enables the media stream to be processed in the media processor 104 which, in turn, enables lower power media processing of media streams corresponding to the peripheral devices 106a,b.

Example control messaging communicated across the peripheral media offload DDI 132 may be for playback and/or record controls of a media stream (e.g., start, stop, pause, rewind, fast forward, skip back, skip forward, etc.), changing properties of a media stream (e.g., volume, mute, tone, balance, audio equalizer effects, color saturations, etc.), terminating media streams, and/or any other controls to be communicated to the media processor 104 so that the media processor 104 can respond accordingly. Changing properties of a media stream may be performed based on property change requests (e.g., received from an OS and/or a media application running on the OS) that are to change media properties in the peripheral devices 106a,b (e.g., in hardware and/or software of the peripheral devices 106a,b) or to change media properties in the host device 100 (e.g., in hardware and/or software of the host device 100). Media properties are controllable by changing values in respective control nodes (e.g., a volume control node, a mute control node, a tone control node, a balance control node, an audio equalizer control node, a color saturation control node, etc.). Media property changes implemented in the peripheral devices 106a,b have associated control nodes corresponding to properties to be implemented in the peripheral devices 106a,b so that the peripheral devices 106a,b can change media properties of media streams received at the peripheral devices 106a,b. Media properties implemented in the host device 100 have associated control nodes corresponding to properties to be implemented in the media processor 104 so that the media processor 104 can change media properties of media streams output by the media processor 104.

Examples disclosed herein may be implemented to handle property change requests in different ways depending on whether the media property change is to be implemented in the peripheral devices 106a,b (e.g., in hardware and/or software of the peripheral devices 106a,b) or in the host device 100 (e.g., in hardware and/or software of the host device 100). For host device-based control nodes (not implemented in the peripheral devices 106a,b) exposed by media software/firmware to host software (e.g., an OS, an application, etc.) running on the host device 100, a control change request such as a volume change request generated by the host software is handled by the peripheral interface host controller manager 108 and/or the media processor manager 110 to cause the media processor 104 to implement the volume change on a corresponding media stream while the offload media stream transfer between the media processor 104 and the peripheral interface host controller 102a,b is running. For example, when a property change request is received by the peripheral interface host controller manager 108 from the host software, the peripheral interface host controller manager 108 sends a corresponding control message to the media processor manager 110 via the peripheral media offload DDI 132 to implement the requested property change on a media stream being processed by the media processor 104. For peripheral device-based control nodes (for properties implemented in the peripheral devices 106a,b) exposed by media software/firmware to the host software (e.g., an OS, an application, etc.) running on the host device 100, the property change request can originate at either the host device 100 or the corresponding peripheral device 106a,b. For example, property change requests handled by peripheral devices (e.g., peripheral device-based control nodes) can originate at the host device 100 based on user inputs received via a media application and/or hardware controls (e.g., buttons) on the host device 100. In such examples, the media processor manager 110 receives the property change requests from the host software and sends corresponding control messages via the peripheral media offload DDI 132 to the peripheral interface host controller manager 108 so that the peripheral interface host controller manager 108 can send the control messages to the peripheral devices 106a,b to implement the property changes on corresponding media streams. Additionally or alternatively, some property change requests handled by peripheral devices originate at the peripheral device 106a,b based on user inputs provided via the peripheral device 106a,b, and the peripheral device 106a,b sends the corresponding property change requests to the host device 100. In such examples, the peripheral devices 106a,b implement the property changes on corresponding media streams (e.g., via amplifiers and/or other hardware and/or software of the peripheral devices 106a,b), and send control messages corresponding to the property change requests to the peripheral interface host controller 102a,b. The peripheral interface host controller manager 108, in turn, sends the control messages via the peripheral media offload DDI 132 to the media processor manager 110 so that the media processor manager 110 can forward the control message to the host software. In such examples, the host software uses the control messages corresponding to the property change requests handled by the peripheral devices 106a,b to track current settings of the media properties of the media streams (e.g., for purposes of displaying volume levels, mute status, video resolution, video color saturation, etc.).

Examples disclosed herein for implementing media stream offloading involve an example capability discovery phase, an example device enumeration and setup phase, an example offloaded media stream transfer phase, and an example offload termination phase. These different phases are implemented using the peripheral interface host controller manager 108 and the media processor manager 110 communicating through the peripheral media offload DDI 132. The example capability discovery phase is described below in connection with FIG. 2 and involves determining whether the peripheral interface host controllers 102a,b and the media processor 104 support media stream offloading. The example device enumeration and setup phase is descried below in connection with FIG. 3 and involves configuring resources such as allocating endpoints (e.g., addressable I/O buffers) and setting up I/O interfaces (e.g., I/O pins) in the peripheral interface host controllers 102a,b and the media processor 104 for transferring an offloaded media stream. The example offloaded media stream transfer phase is described below in connection with FIG. 5 and involves transferring the media stream directly between the peripheral interface host controllers 102a,b and the media processor 104 using the endpoints and I/O interfaces. The example offload termination phase is also described below in connection with FIG. 5 and involves de-allocating resources corresponding to the terminated media stream.

Figure 2:
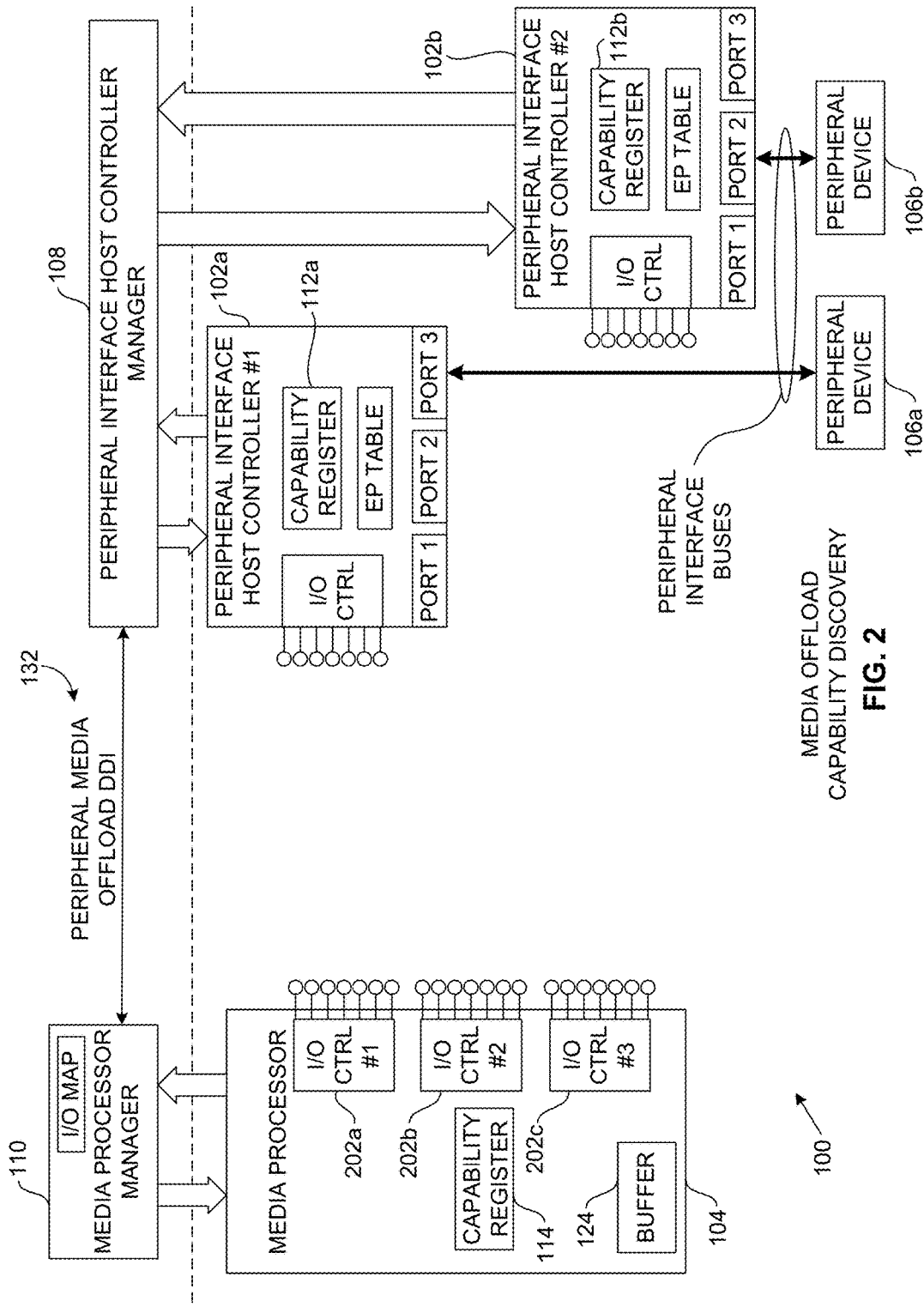
FIG. 2 illustrates the example host device of FIG. 1 during a media offload capability discovery phase.

FIG. 2 illustrates the example host device 100 of FIG. 1 during an example media offload capability discovery phase. In the media offload capability discovery phase, the peripheral interface host controller manager 108 and the media processor manager 110 check for the availability of media offload capabilities in the peripheral interface host controllers 102a,b and the media processor 104 by checking media offload capability information in respective ones of the host controller capability registers 112a,b and the media processor capability register 114. In some examples, the discovery of media offload capabilities of the peripheral interface host controllers 102a,b and the media processor 104 may be performed in response to a system startup or a reboot of the host device 100. Additionally or alternatively, the discovery of media offload capabilities of the peripheral interface host controllers 102a,b and the media processor 104 may be performed in response to detecting that a peripheral device 106a,b has been connected to a peripheral interface host controller 102a,b. In some such examples, the discovery of the media offload capabilities is performed when the peripheral device 106a,b is of a type of device class for which a media stream is to be created. Example types of devices classes for which media streams are created include an audio device class (e.g., a speaker, a microphone, a sound card, a musical instrument digital interface (MIDI) device, etc.), an image device class (e.g., a webcam, a scanner, etc.), a video device class (e.g., a webcam, a surveillance camera, etc.), and an audio/video device class (e.g., a webcam, a television, a radio, etc.).

In examples in which the discovery of media offload capabilities of the peripheral interface host controllers 102a,b and the media processor 104 is performed in response to a system startup or a reboot of the host device 100, the peripheral interface host controller manager 108 queries the host controller capability registers 112a,b, and the media processor manager 110 queries the media processor capability register 114 to determine the availability of media offload capabilities in the peripheral interface host controllers 102a,b and in the media processor 104.

To determine the media offload capabilities of the peripheral interface host controllers 102a,b, when a peripheral device 106a,b is connected to one of the peripheral interface host controllers 102a,b, that peripheral interface host controller 102a,b sends an interrupt or notification of the peripheral device connection to the example peripheral interface host controller manager 108. Based on the interrupt or notification, the peripheral interface host controller manager 108 detects the peripheral device connection and, in response, queries the host controller capability register 112a,b of the peripheral interface host controller 102a,b to which the peripheral device 106a,b is connected to determine the availability of media offload capability of that peripheral interface host controller 102a,b. Also in response to detecting the peripheral interface connection, the example peripheral interface host controller manager 108 sends an interrupt or notification to the example media processor manager 110. In response to the interrupt or notification, the example media processor manager 110 queries the media processor capability register 114 to determine the availability of a media offload capability of the media processor 104. In addition, the example media processor manager 110 may determine the number of I/O controllers 202a-c available on the media processor manager 110 and to determine the resources (e.g., I/O pins, maximum FIFO buffer size) available/required for each I/O controller 202a-c. The example I/O controllers 202a-c of the media processor 104 may be implemented using any suitable type of I/O interface including scalable I/O (SIO) interfaces for which SIO controllers have resizable buffers. Other example I/O interfaces that may be used to implement the I/O controllers 202a-c include a serial peripheral interface (SPI), a universal asynchronous receiver transmitter (UART) interface, an inter-IC sound ($I^2S$) bus, virtual I/O interfaces (e.g., Intel On-chip System Fabric (IOSF) interfaces), etc.

In the illustrated example, after the peripheral interface host controller manager 108 and the media processor manager 110 discover the media offload capabilities of the respective peripheral interface host controller 102a,b and the media processor 104, the peripheral interface host controller manager 108 and the media processor manager 110 establish the peripheral media offload DDI 132 as a control path therebetween. In this manner, the peripheral interface host controller manager 108 and the media processor manager 110 can send control messages to each other across the peripheral media offload DDI 132 to control media stream processing by the media processor 104 and to control the media stream transfer between the media processor 104 and the peripheral interface host controller(s) 102a,b.

Figure 3:
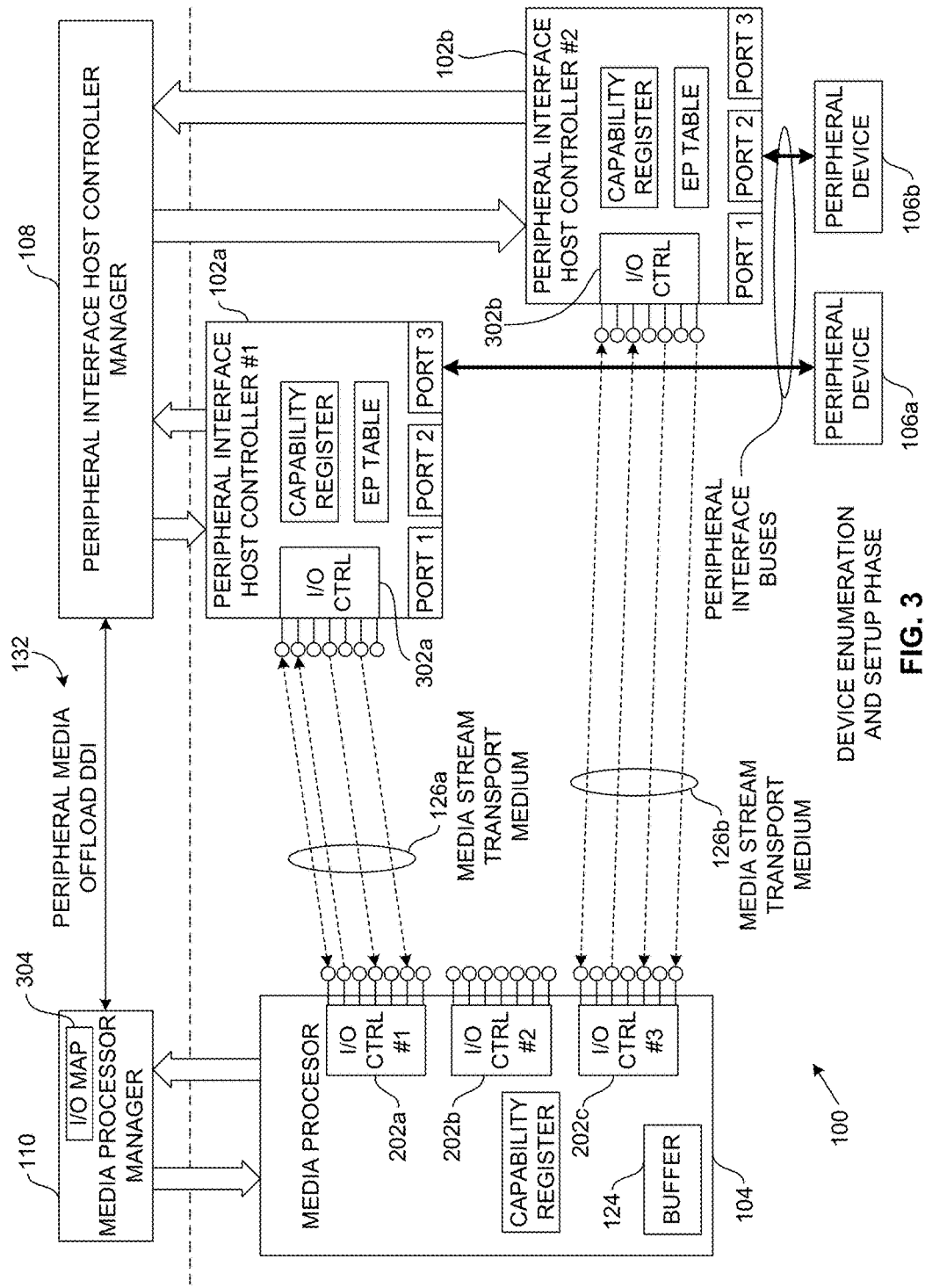
FIG. 3 illustrates the example host device of FIGS. 1 and 2 during a device enumeration and setup phase.
Figure 4:
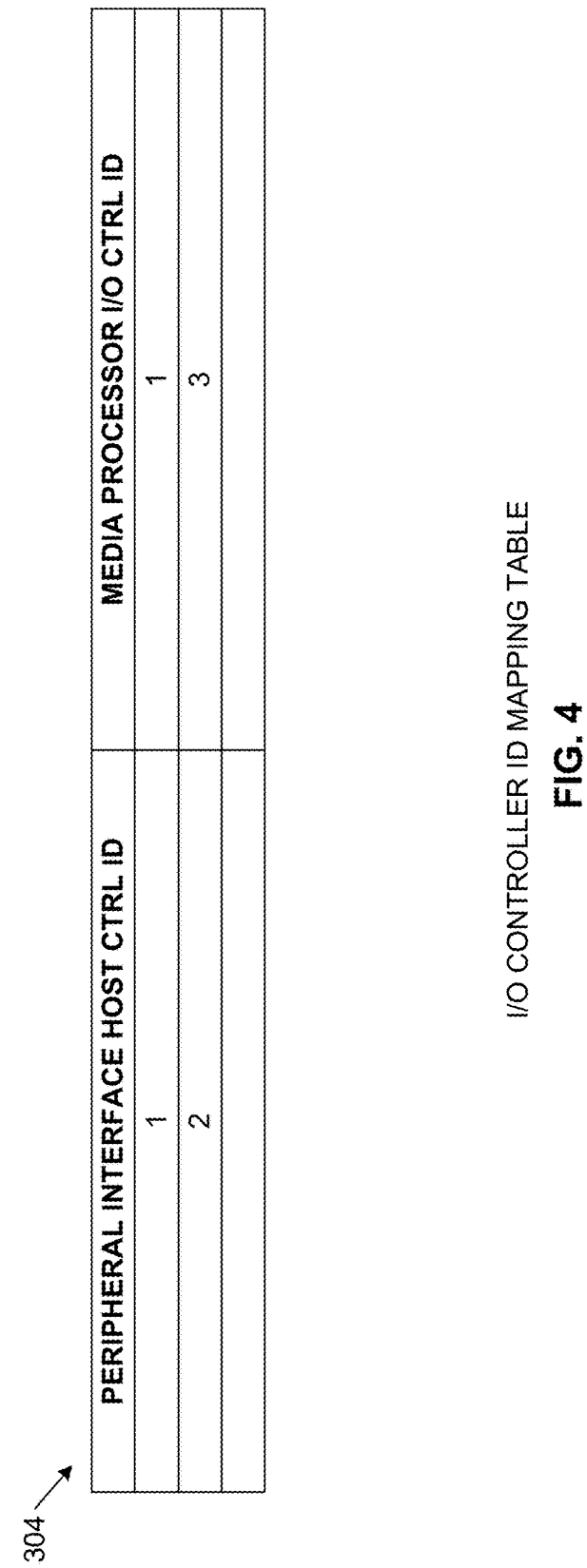
FIG. 4 illustrates an example input/output (I/O) controller identifier (ID) mapping table to map peripheral interface host controller I/O interfaces to media processor I/O interfaces.

FIG. 3 illustrates the example host device 100 of FIG. 1 during a device enumeration and setup phase. In the illustrated example of FIG. 3, after the peripheral interface host controller manager 108 and the media processor manager 110 establish the peripheral media offload DDI 132, the peripheral interface host controller manager 108 and the media processor manager 110 can communicate control information via the peripheral media offload DDI 132 when peripheral devices 106a,b are connected to the host device 100 to establish media stream transport mediums 126a,b. For example, when a peripheral device 106a,b is attached to a physical port of one of the peripheral interface host controllers 102a,b, the peripheral interface host controller manager 108 enumerates the connected peripheral device 106a,b and attempts to offload a media stream corresponding to the peripheral device 106a,b by sending a media stream offload request to the media processor manager 110 via the peripheral media offload DDI 132. In the illustrated example, the peripheral interface host controller manager 108 includes in the request a peripheral interface host controller ID of the peripheral interface host controller 102a,b to which the peripheral device 106a,b is connected. The example media processor manager 110 uses the peripheral interface host controller ID to identify an I/O controller 302a-c of the media processor 104 that is in circuit with the peripheral interface host controller 102a,b to which the peripheral device 106a,b was connected. For example, the media processor manager 110 is provided with an example I/O controller ID mapping table 304 which, as shown in FIG. 4, stores mappings between the I/O controllers 302a,b of the peripheral interface host controllers 102a,b and corresponding ones of the I/O controllers 202a-c of the media processor 104 that are physically connected to one another. The media processor manager 110 uses the example I/O controller ID mapping table 304 to activate or enable the media stream transport mediums 126a,b between the I/O controllers 202a,c of the media processor 104 and corresponding ones of the I/O controllers 302a,b of the peripheral interface host controllers 102a,b to transfer media streams therebetween. Such activating or enabling of the media stream transport mediums 126a,b may be accomplished by disabling high-impedance states of pins to be used for the media stream transfers. The example I/O controllers 302a,b of the peripheral interface host controllers 102a,b are implemented using the same type of I/O interface used to implement the I/O controllers 202a-c of the media processor 104.

In the example I/O controller ID mapping table 304 of FIG. 4, pins of the I/O controller 302a of the peripheral interface host controller 102a (e.g., peripheral interface host controller ID #1) are in circuit with corresponding pins of the I/O controller 202a (e.g., media processor I/O controller ID #1) of the media processor 104, and pins of the I/O controller 302b of the peripheral interface host controller 102b (e.g., peripheral interface host controller ID #2) are in circuit with corresponding pins of the I/O controller 202c (e.g., media processor I/O controller ID #3) of the media processor 104. In some examples, mappings between such I/O controllers are made during design of the host device 100. The mappings between particular I/O controllers are based on various design factors such as routing constraints, I/O controller capabilities, etc. of particular system designs. As such, mappings shown in the example I/O controller ID mapping table 304 are merely example mappings.

In response to receiving the media stream offload request from the peripheral interface host controller manager 108, the media processor manager 110 queries the example I/O controller ID mapping table 304 based on the peripheral interface host controller ID to select one of the I/O controllers 202a-c of the media processor 104 that is identified as being in circuit with the peripheral interface host controller 102a,b corresponding to the peripheral interface host controller ID. The media processor manager 110 enumerates endpoints for use with the identified I/O controller 202a-c and the capabilities of the endpoints such as supported stream formats (e.g., pulse code modulation (PCM), Advanced Audio Coding (AAC), WAV, etc.), volume capabilities, mute capabilities, side tone capabilities, video resolution capabilities, video color-depth capabilities, etc. In examples in which the peripheral interface host controllers 102a,b are USB host controllers, the media processor manager 110 configures the endpoints in the I/O controller 202a-c as USB endpoints having corresponding capabilities that may be employed over USB connections.

The media processor manager 110 also constructs appropriate filters (e.g., a filter topology, which is a logical representation of an internal structure of hardware implementing a filter, specifies the data-flow paths through the filter, and defines the logical targets (pins and nodes) for property requests) and nodes (e.g., a volume control node, a mute control node, a side tone control node, etc.) based on the enumerated capabilities of the endpoints. The example media processor manager 110 then exposes or provides such resources to host OS software (e.g., an OS and/or application(s) running on the host device 100). Also as part of the enumeration process, the media processor manager 110 allocates resources of the I/O controller 202a-c such as I/O pin(s), I/O transfer buffers, etc. If all resource allocations are successful, the media processor manager 110 uses the peripheral media offload DDI 132 to send a media stream offload response to the peripheral interface host controller manager 108 in which the media processor manager 110 accepts the media stream offload request. In addition, the media processor manager 110 sends resource information indicative of the allocated resources to the peripheral interface host controller manager 108 via the peripheral media offload DDI 132. In some examples, the media processor manager 110 sends the resource information in the media stream offload response. Alternatively, if the resource allocations are not successful, the media processor manager 110 uses the peripheral media offload DDI 132 to send a media stream offload response to the peripheral interface host controller manager 108 in which the media processor manager 110 rejects the media stream offload request. In such examples, the media stream is processed by an application processor using prior techniques without offloading the media stream to the media processor 104.

In the illustrated example of FIG. 3, the peripheral interface host controller manager 108 uses the resource information to configure the pins of the I/O controller 302a of the peripheral interface host controller 102a to communicate with the pins of the I/O controller 202a of the media processor 104 to establish the media stream transport medium 126a of FIG. 1. In this manner, the media stream transport medium 126a is used to transfer a media stream corresponding to the peripheral device 106a connected to the peripheral interface host controller 102a. Also in the illustrated example, the peripheral interface host controller manager 108 uses the resource information to configure the pins of the I/O controller 302b of the peripheral interface host controller 102b to communicate with the pins of the I/O controller 202c of the media processor 104 to establish the media stream transport medium 126b of FIG. 1. In this manner, the media stream transport medium 126b is used to transfer a media stream corresponding to the peripheral device 106b connected to the peripheral interface host controller 102b.

In some examples, resource allocation during an enumeration process may be performed while a media stream is already opened on an offloaded media stream endpoint to enable more dynamic resource management. For example, the media processor manager 110 may accept the media stream offload request and start a media stream transfer while continuing to allocate remaining resources and/or re-allocating different resources for the media stream. This may be used to dynamically adapt resources to suit the needs and/or requirements of a changing media stream.

Figure 5:
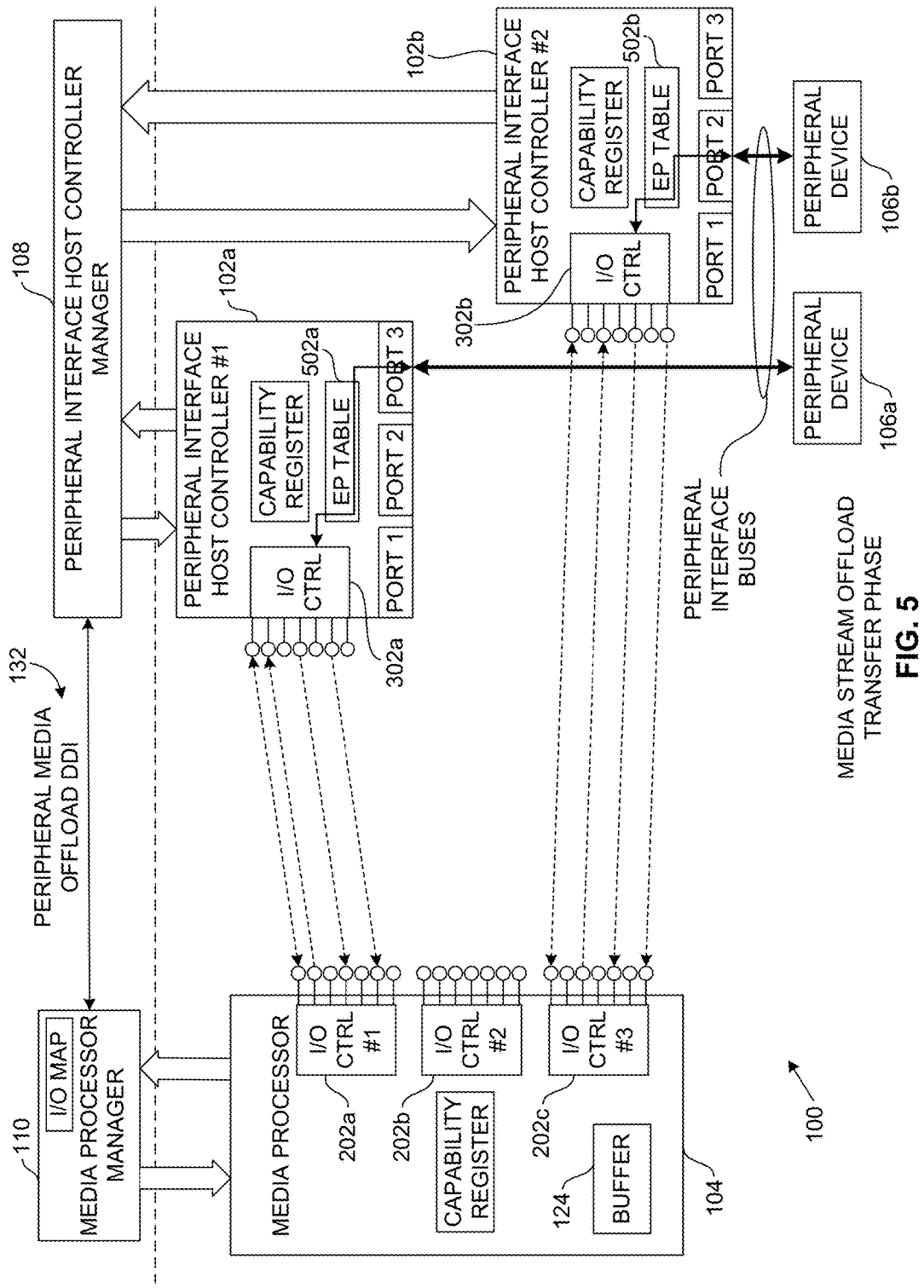
FIG. 5 illustrates the example host device of FIGS. 1-3 during an offload media stream transfer phase.

FIG. 5 illustrates the example host device 100 of FIGS. 1-3 during an offload media stream transfer phase. To configure the peripheral interface host controllers 102a,b for media stream transfers, the peripheral interface host controllers 102a,b are provided with corresponding example endpoint mapping tables 502a,b. The example endpoint mapping tables 502a,b are shown in detail in FIG. 6. Endpoint table entries of the endpoint mapping tables 502a,b provide mappings between pin numbers of input pin(s), output pin(s), and/or bi-directional pin(s) of the peripheral interface host controllers 102a,b (e.g., I/O pin number fields 602), I/O buffer addresses (e.g., peripheral interface endpoint address fields 604) of the peripheral interface host controllers 102a,b, and port numbers (e.g., device slot number fields 606) of the peripheral interface host controllers 102a,b to which peripheral devices 106a,b are connected. The endpoint table entries of the endpoint mapping tables 502a,b also includes split endpoint fields 608 to identify corresponding endpoints that are split endpoints for use with split transactions in which long transactions are split and transferred in multiple smaller transactions. The peripheral interface host controllers 102a,b uses the mapping information in the endpoint mapping table 502a,b to route media streams between ports, endpoints, and I/O pins of the peripheral interface host controllers 102a,b for transferring to/from corresponding ones of the I/O controllers 202a-c of the media processor 104. For example, when a media stream is opened in the offload endpoints of the media processor 104 in response to a media stream offload request from the peripheral interface host controller manager 108, the media processor manager 110 sends a media stream offload response accepting the media stream offload request to the peripheral interface host controller manager 108 via the peripheral media offload DDI 132. In response, the peripheral interface host controller manager 108 programs endpoint table entries of the endpoint mapping table 502a,b to map I/O controller pin numbers of the peripheral interface host controller 102a,b with endpoints allocated in a corresponding peripheral interface host controller 102a,b for storing media stream data received from the media processor 104 and/or for storing media stream data for sending to the media processor 104. In the illustrated example of FIG. 6, the endpoint mapping table 502a,b also includes validity fields 610 for use by the peripheral interface host controller manager 108 to identify what endpoint table entries are valid. Valid endpoint table entries correspond to media stream transfers that are active. Invalid endpoint table entries correspond to media stream transfers that are not active, have been terminated, etc. In some examples, a power-on default value of an inactive endpoint identifies the endpoint as invalid in a corresponding validity field.

Also during the offload media stream transfer phase of the illustrated example, the media processor manager 110 configures the media processor 104 (e.g., DMA scheduling, I/O controller settings, etc.) based on a selected media stream format and places the media stream in a run state. The peripheral interface host controller 102a,b uses its corresponding endpoint mapping table 502a,b to route the media stream transfer between a corresponding I/O controller 302a,b and a corresponding one of the peripheral devices 106a,b connected to the peripheral interface host controller 102a,b.

In the illustrated example of FIG. 5, when a media stream is output by the media processor 104, the media processor 104 accesses media data loaded in the data buffer 124 from the memory 118 (FIG. 1), processes the media data to generate the media stream, and loads the media stream in an output buffer of a corresponding I/O controller 202a-c for transfer to a connected one of the peripheral devices 106a,b via a corresponding peripheral interface host controller 102a,b. In addition, when a media stream is input to the media processor 104 (e.g., received from one of the peripheral devices 106a,b), the media stream is received at an input buffer of an I/O controller 202a-c from one of the peripheral interface host controllers 102a,b, processed by the media processor 104, and written to the data buffer 124 for subsequent storing in the memory 118. In examples disclosed herein, the media processor manager 110 and/or the media processor 104 configure(s) the size(s) of the input and output buffers of the I/O controllers 202a-c during the media offload capability discovery phase of FIG. 2. In addition, the peripheral interface host controller manager 108 and/or the peripheral interface host controllers 102a,b configure(s) the size(s) of the input and output buffers of the I/O controllers 302a,b. Such selecting of I/O buffer sizes is used to achieve different media transfer and/or energy efficiency performance results (e.g., by reducing the number of times the media stream transport mediums 126a,b need to be activated during a media stream to transfer media stream data). For example, larger I/O buffer sizes that hold more data can be used to reduce the number of data transfer transactions via the media stream transport mediums 126a,b. As such, the media stream transport mediums 126a,b can be held in a low-power inactive state for longer periods of time. This saves power by placing corresponding lines of I/O controller in a high-impedance state that substantially reduces or eliminates flow of electrical current to decrease power consumption.

To terminate the offload media stream transfer, the peripheral interface host controller manager 108 and the media processor manager 110 coordinate the termination via the peripheral media offload DDI 132. For example, when a media stream opened and running on an offloaded endpoint is stopped (e.g., a user stops media playback or recording, or the end of a media file is reached), the media processor manager 110 sends a termination request to the peripheral interface host controller manager 108 via the peripheral media offload DDI 132. In addition, when a peripheral interface host controller 102a,b detects events pertaining to connectivity of a peripheral device 106a,b (e.g., an unplugging event pertaining to a peripheral device 106a,b being disconnected from a peripheral interface host controller 102a,b, a power-loss event pertaining to a peripheral device 106a,b losing power, etc.), the peripheral interface host controller 102a,b reports the event to the peripheral interface host controller manager 108, and the peripheral interface host controller manager 108 notifies the media processor manager 110. During termination of an offload media stream transfer, the peripheral interface host controller manager 108 programs corresponding entries of the endpoint mapping table 502a,b as invalid. In response to the termination request from the peripheral interface host controller manager 108, the media processor manager 110 selects corresponding resources (e.g., I/O buffers, I/O controller pins, etc.) that were previously allocated to the media stream to be terminated, and de-allocates those resources. In this manner, by allocating and de-allocating resources for use only when media stream transfers are active, dynamic resource management is used to more efficiently use resources of the host device 100. Such dynamic resource allocation provides more resource availability when needed for other media stream transfers and reduces power consumption of the host device when media stream transfers are not active.

Figure 7:
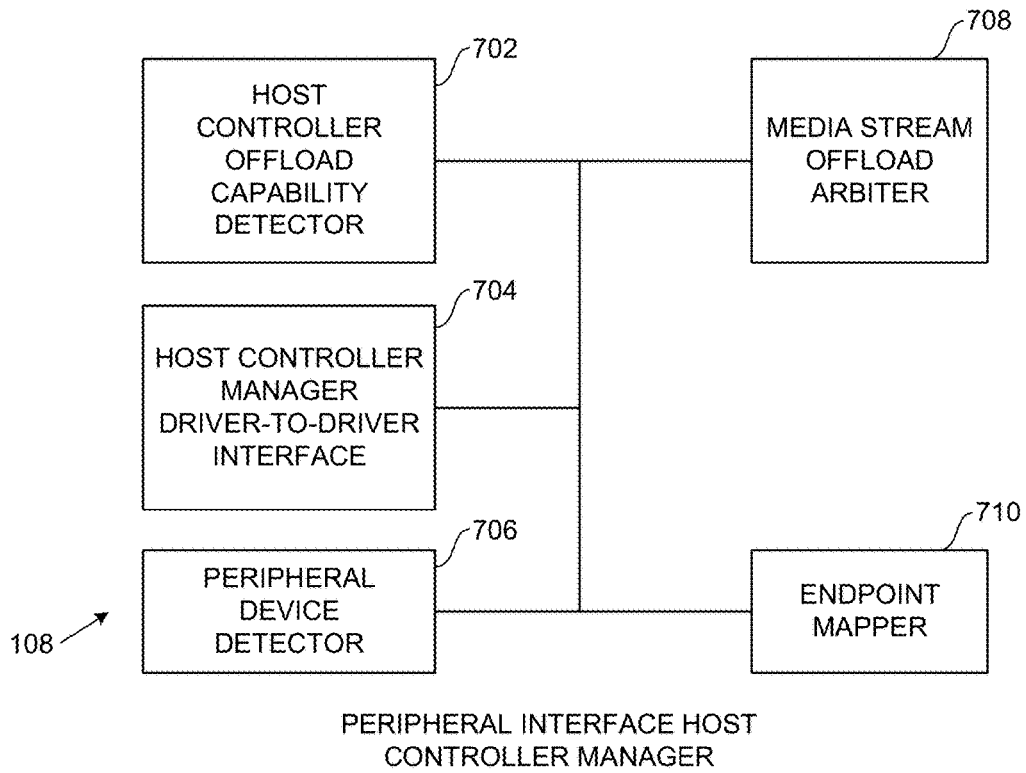
FIG. 7 illustrates the example peripheral interface host controller manager of FIGS. 1-3 and 5.

FIG. 7 illustrates the example peripheral interface host controller manager 108 of FIGS. 1, 2, 3, and 5. The peripheral interface host controller manager 108 of the illustrated example includes an example host controller offload capability detector 702, an example host controller manager driver-to-driver interface 704 (e.g., a host controller manager communication interface), an example peripheral device detector 706, an example media stream offload arbiter 708, and an example endpoint mapper 710. The peripheral interface host controller manager 108 is provided with the example host controller offload capability detector 702 to determine whether the peripheral interface host controllers 102a,b include a media stream offload capability. For example, the host controller offload capability detector 702 queries the host controller capability register 112a (FIGS. 1 and 2) to determine whether the peripheral interface host controller 102a includes a media stream offload capability and/or queries the host controller capability register 112b (FIGS. 1 and 2) to determine whether the peripheral interface host controller 102b includes a media stream offload capability.

The peripheral interface host controller manager 108 is provided with the example host controller manager driver-to-driver interface 704 to implement the peripheral media offload DDI 132 between the peripheral interface host controller manager 108 and the media processor manager 110. The example host controller manager driver-to-driver interface 704 negotiates with the media processor manager 110 to establish the peripheral media offload DDI 132 based on whether the media processor 104 supports media stream offloading and based on the host controller offload capability detector 702 determining that media stream offloading is supported by the peripheral interface host controller 102a and/or the peripheral interface host controller 102b. When media stream offloading is supported by the media processor 104 and by the peripheral interface host controller 102a and/or the peripheral interface host controller 102b, the host controller manager driver-to-driver interface 704 establishes access to the peripheral media offload DDI 132 from the perspective of the peripheral interface host controller manager 108. For example, the host controller manager driver-to-driver interface 704 allocates I/O messaging buffers in a memory (e.g., the local memory 1013 and/or the volatile memory 1014 of FIG. 10). In this manner, in implementing the peripheral media offload DDI 132, the host controller manager driver-to-driver interface 704 of the illustrated example uses the I/O messaging buffers to send messages via the peripheral media offload DDI 132 to the media processor manager 110 and to receive messages via the peripheral media offload DDI 132 from the media processor manager 110.

The peripheral interface host controller manager 108 is provided with the example peripheral device detector 706 to detect when a peripheral device 106a,b is connected to one of the peripheral interface host controllers 102a,b. For example, the peripheral device detector 706 may receive an interrupt or a notification from a peripheral interface host controller 102a,b when a peripheral device 106a,b is connected thereto.

The peripheral interface host controller manager 108 is provided with the example media stream offload arbiter 708 to request media stream offloading and manage offloading of media streams to the media processor 104. In examples disclosed herein, the media stream offload arbiter 708 also separates control information from media streams received from a peripheral device 106a,b. The example media stream offload arbiter 708 communicates with the host controller manager driver-to-driver interface 704 to exchange control messages with the media processor manager 110 via the peripheral media offload DDI 132. For example, in response to the media stream offload arbiter 708 receiving a request (e.g., from host software) to open a media stream for a peripheral device 106a,b (e.g., corresponding to a media stream playback or a media stream recording), the media stream offload arbiter 708 sends a media stream offload request to the media processor manager 110 to request offloading of a media stream to the media processor 104. In addition, the example media stream offload arbiter 708 receives media stream offload responses from the media processor manager 110 that reject or accept offloading of media streams to the media processor 104. The example media stream offload arbiter 708 uses the media stream offload responses to manage when media stream offloading to the media processor 104 can be performed. In some examples, the media stream offload arbiter 708 sends control information to the media processor manager 110 to control property changes (e.g., volume changes, mute changes, playback control (play, pause, skip, etc.), video resolution changes, etc.) of the media stream and/or to control other management corresponding to the media stream (e.g., setup of media stream transfers, termination of media stream transfers, etc.). Additionally or alternatively, the media stream offload arbiter 708 handles the control information to manage aspects of the media stream.

The peripheral interface host controller manager 108 is provided with the example endpoint mapper 710 to generate endpoint table entries in the endpoint mapping table 502a,b (FIGS. 5 and 6) corresponding to media stream connections between the I/O controllers 202a,b of the media processor 104 and the I/O controllers 302a,b of the peripheral interface host controllers 102a,b. For example, the endpoint mapper 710 programs endpoint table entries in the endpoint mapping table 502a,b to map input pin(s), output pin(s), and/or bi-directional pin(s) of an I/O controller 202a,b with endpoint(s) (e.g., a buffer(s)) of the peripheral interface controller 102a,b and with port number(s) (e.g., device slot number(s)) of the peripheral interface host controller 102a,b to which a peripheral device(s) 106a,b are connected.

In examples disclosed herein, means for detecting a media stream offload capability of the peripheral interface host controller 102a,b may be implemented by the host controller offload capability detector 702. In examples disclosed herein, means for communicating via the peripheral media offload DDI 132 with the media processor manager 110 may be implemented by the host controller manager driver-to-driver interface 704. In examples disclosed herein, means for detecting that a peripheral device 106a,b is connected to a peripheral interface host controller 102a,b may be implemented by the peripheral device detector 706. In examples disclosed herein, means for sending a media stream offload request to the media processor manager 110 and/or means for receiving a media stream offload response from the media processor manager 110 may be implemented by the media stream offload arbiter 708. In examples disclosed herein, means for generating an endpoint table entry may be implemented by the endpoint mapper 710. In examples disclosed herein, means for programming an endpoint table entry may be implemented by the endpoint mapper 710.

Figure 8:
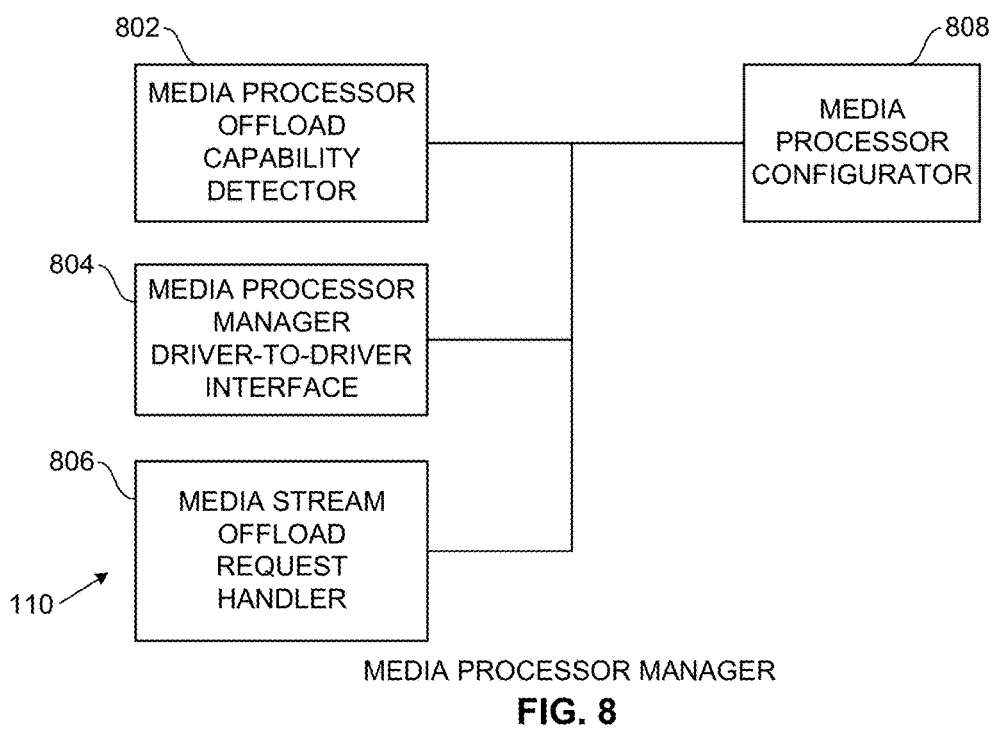
FIG. 8 illustrates the example media processor manager of FIGS. 1-3 and 5.

FIG. 8 illustrates the example media processor manager 110 of FIGS. 1, 2, 3, and 5. The media processor manager 110 of the illustrated example includes an example media processor offload capability detector 802, an example media processor manager driver-to-driver interface 804 (e.g., a media processor manager communication interface), an example media stream offload request handler 806, and an example media processor configurator 808. The media processor manager 110 is provided with the example media processor offload capability detector 802 to determine whether the media processor 104 includes a media stream offload capability. For example, the media processor offload capability detector 802 queries the media processor capability register 114 (FIGS. 1 and 2) to determine whether the media processor 104 includes a media stream offload capability.

The media processor manager 110 is provided with the example media processor manager driver-to-driver interface 804 to implement the peripheral media offload DDI 132 between the media processor manager 110 and the peripheral interface host controller manager 108. The example media processor manager driver-to-driver interface 804 negotiates with the peripheral interface host controller manager 108 to establish the peripheral media offload DDI 132 based on whether the peripheral interface host controller 102a and/or the peripheral interface host controller 102b support(s) media stream offloading and based on the media processor offload capability detector 802 determining that media stream offloading is supported by the media processor 104. When media stream offloading is supported by the media processor 104 and by the peripheral interface host controller 102a and/or the peripheral interface host controller 102b, the media processor manager driver-to-driver interface 804 establishes access to the peripheral media offload DDI 132 from the perspective of the media processor manager 110. For example, the media processor manager driver-to-driver interface 804 allocates I/O messaging buffers. In this manner, in implementing the peripheral media offload DDI 132, the media processor manager driver-to-driver interface 804 of the illustrated example uses the I/O messaging buffers to send messages via the peripheral media offload DDI 132 to the peripheral interface host controller manager 108 and to receive messages via the peripheral media offload DDI 132 from the peripheral interface host controller manager 108.

The media processor manager 110 is provided with the example media stream offload request handler 806 to process media stream offload requests from the peripheral interface host controller manager 108 by determining whether resources to handle media stream offloading are available in the media processor 104, and sending media stream offload responses to the peripheral interface host controller manager 108 to accept media stream offload requests when such resources are available or to reject media stream offload requests when such resources are not available.

The media processor manager 110 is provided with the example media processor configurator 808 to allocate and/or configure resources (e.g., I/O buffers, I/O pins, etc.) in the media processor 104 to process offloaded media streams. The example media processor configurator 808 provides resource information indicative of the allocated/configured resources to the media processor manager driver-to-driver interface 804 for sending to the peripheral interface host controller manager 108 so that the peripheral interface host controller manager 108 can use the resource information to configure the peripheral interface host controllers 102a,b so that media streams can be transferred between the peripheral interface host controllers 102a,b and the media processor 104.

In examples disclosed herein, the media stream offload request handler 806 and the media processor configurator 808 also receive media stream control requests from the peripheral interface host controller manager 108 and manage media streams based on such media stream control requests. Example media stream control requests are based on control information that the peripheral interface host controllers 102a,b separate from media streams received from peripheral devices 106a,b. Such control information may be processed by the media stream offload request handler 806 and/or the media processor configurator 808 to control property changes (e.g., volume changes, mute changes, playback control (play, pause, skip, etc.), video resolution changes, etc.) of media streams and/or to control other management corresponding to the media streams (e.g., setup of media stream transfers, termination of media stream transfers, etc.).

In examples disclosed herein, means for detecting a media stream offload capability of the media processor 104 may be implemented by the media processor offload capability detector 802. In examples disclosed herein, means for communicating via the peripheral media offload DDI 132 with the peripheral interface host controller manager 108 may be implemented by the media processor manager driver-to-driver interface 804. In examples disclosed herein, means for receiving media stream offload requests and/or means for sending media stream offload responses may be implemented by the media stream offload request handler 806. In examples disclosed herein, means for allocating a communication interface (e.g., an I/O controller 202a-c) of the media processor 104, means for allocating resources of the media processor 104, and/or means for querying the example I/O controller ID mapping table 304 may be implemented by the media processor configurator 808.

While an example manner of implementing the peripheral interface host controller manager 108 of FIGS. 1-3 and 5 is illustrated in FIG. 7 and an example manner of implementing the media processor manager 110 of FIGS. 1-3 and 5 is illustrated in FIG. 8, one or more of the elements, processes and/or devices illustrated in FIGS. 7 and 8 may be combined, divided, re-arranged, omitted, eliminated and/or implemented in any other way. Further, the example host controller offload capability detector 702, the example host controller manager driver-to-driver interface 704, the example peripheral device detector 706, the example media stream offload arbiter 708, the example endpoint mapper 710, the example media processor offload capability detector 802, the example media processor manager driver-to-driver interface 804, the example media stream offload request handler 806, and the example media processor configurator 808 and/or, more generally, the example peripheral interface host controller manager 108 of FIGS. 1-3, 5, and 7 and/or the example media processor manager 110 of FIGS. 1-3, 5, and 8 may be implemented by hardware, software, firmware and/or any combination of hardware, software and/or firmware. Thus, for example, any of the example host controller offload capability detector 702, the example host controller manager driver-to-driver interface 704, the example peripheral device detector 706, the example media stream offload arbiter 708, the example endpoint mapper 710, the example media processor offload capability detector 802, the example media processor manager driver-to-driver interface 804, the example media stream offload request handler 806, and the example media processor configurator 808 and/or, more generally, the example peripheral interface host controller manager 108 and/or the example media processor manager 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host controller offload capability detector 702, the example host controller manager driver-to-driver interface 704, the example peripheral device detector 706, the example media stream offload arbiter 708, the example endpoint mapper 710, the example media processor offload capability detector 802, the example media processor manager driver-to-driver interface 804, the example media stream offload request handler 806, and/or the example media processor configurator 808 is/are hereby expressly defined to include a non-transitory computer readable storage device or storage disk such as a memory, a digital versatile disk (DVD), a compact disk (CD), a Blu-ray disk, etc. including the software and/or firmware. Further still, the example peripheral interface host controller manager 108 and/or the example media processor manager 110 may include one or more elements, processes and/or devices in addition to, or instead of, those illustrated in FIG. 7 and/or FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
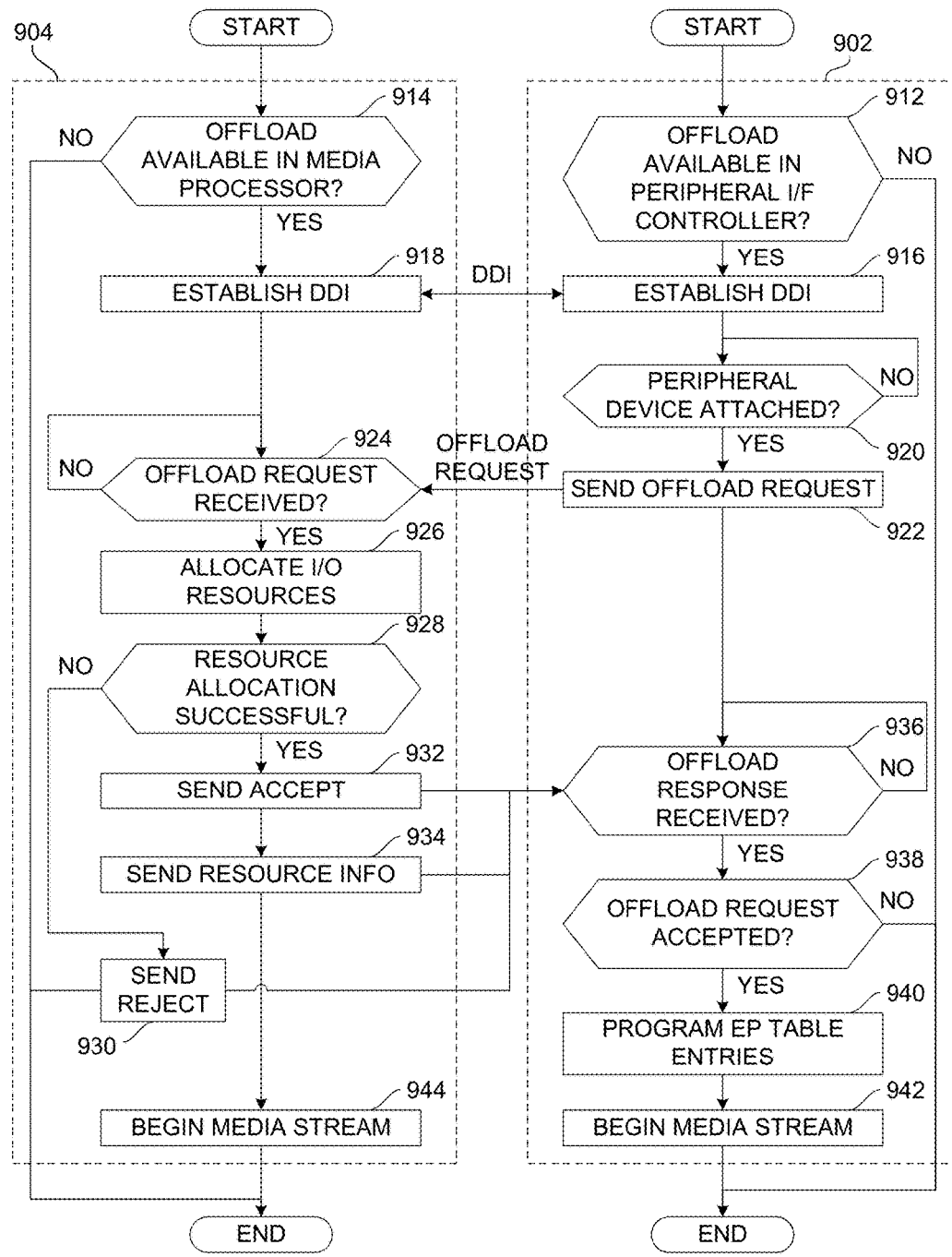
FIG. 9 depicts a flowchart representative of example computer readable instructions that may be executed to implement the example peripheral interface host controller manager of FIGS. 1-3, 5, and 7 and/or the example media processor manager of FIGS. 1-3, 5, and 8 to perform an offload media stream transfer.

A flowchart representative of example hardware logic or machine readable instructions for implementing the peripheral interface host controller manager 108 and the media processor manager 110 is shown in FIG. 9. The machine readable instructions may be one or more programs or portion(s) of one or more programs for execution by a processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example the peripheral interface host controller manager 108 and the example media processor manager 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 9 depicts a flowchart representative of example computer readable instructions that may be executed to implement the example peripheral interface host controller manager 108 of FIGS. 1-3, 5, and 7 and/or the example media processor manager 110 of FIGS. 1-3, 5, and 8 to perform an offload media stream transfer between the media processor 104 and the peripheral interface host controller 102a and/or the peripheral interface host controller 102b of FIGS. 1-3 and 5. The flowchart of the illustrated example includes two processes shown as an example peripheral interface host controller manager process 902 and an example media processor manager process 904. The example peripheral interface host controller manager process 902 is representative of operations performed to implement the peripheral interface host controller manager 108. The example media processor manager process 904 is representative of operations performed to implement the media processor manager 110.

The example programs of FIG. 9 begin at block 912 of the peripheral interface host controller manager process 902 and block 914 of the media processor manager process 904. For example, the peripheral interface host controller manager process 902 and the media processor manager process 904 may start in response to a system startup or reboot of the host device 100 of FIGS. 1-3 and 5. At block 912, the example host controller offload capability detector 702 (FIG. 7) determines whether a media stream offload capability is available in the peripheral interface host controller(s) 102a, b. For example, the host controller offload capability detector 702 queries the host controller capability register 112a (FIGS. 1 and 2) to determine whether the peripheral interface host controller 102a includes a media stream offload capability and/or queries the host controller capability register 112b (FIGS. 1 and 2) to determine whether the peripheral interface host controller 102b includes a media stream offload capability. At block 914, the example media processor offload capability detector 802 (FIG. 8) determines whether a media stream offload capability is available in the media processor 104. For example, the media processor offload capability detector 802 queries the media processor capability register 114 (FIGS. 1 and 2) to determine whether the media processor 104 includes a media stream offload capability.

If at block 912, the example host controller offload capability detector 702 determines that a media stream offload capability is not available in the peripheral interface host controller(s) 102a,b, or if at block 914, the example media processor offload capability detector 802 determines that a media stream offload capability is not available in the media processor 104, the example processes of FIG. 9 end because offloading of media streams corresponding to peripheral devices 106a,b (FIGS. 1, 2, 3, and 5) is not supported in the host device 100. In such instances, the media stream transfer may be accomplished using prior techniques by using an application processor to perform the media stream transfer.

If at block 912, the example host controller offload capability detector 702 determines that a media stream offload capability is available in the peripheral interface host controller(s) 102a,b, and if at block 914, the example media processor offload capability detector 802 determines that a media stream offload capability is available in the media processor 104, the example host controller manager driver-to-driver interface 704 (FIG. 7) establishes the peripheral media offload DDI 132 with the media processor manager 110 (block 916), and the example media processor manager driver-to-driver interface 804 (FIG. 8) establishes the peripheral media offload DDI 132 with the peripheral interface host controller manager 108 (block 918). For example, the host controller manager driver-to-driver interface 704 allocates I/O messaging buffers corresponding to the peripheral interface host controller manager 108 for messaging with the media processor manager driver-to-driver interface 804 via the peripheral media offload DDI 132. In addition, the media processor manager driver-to-driver interface 804 allocates I/O buffers corresponding to the media processor manager 110 for messaging with the host controller manager driver-to-driver interface 704 via the peripheral media offload DDI 132.

At block 920 of the peripheral interface host controller manager process 902, the example peripheral device detector 706 (FIG. 7) determines whether a peripheral device 106a,b has been attached. For example, the peripheral device detector 706 may receive an interrupt or a notification from a peripheral interface host controller 102a,b when a peripheral device 106a,b is connected thereto. In some examples, the peripheral device detector 706 confirms that the connected peripheral device 106a,b is of a type of device class for which a media stream is to be created such that peripheral devices of other types of device classes (e.g., types of device classes for which media streams are not to be created) are ignored. When the peripheral device detector 706 determines at block 920 that a peripheral device 106a,b has been attached, the example media stream offload arbiter 708 (FIG. 7) sends a media stream offload request to the media processor manager 110 (block 922). For example, the media stream offload arbiter 708 sends the media stream offload request to the media processor manager 110 based on the media stream offload capability of the peripheral interface host controller 102a,b and based on the peripheral device 106a,b being connected to the peripheral interface host controller 102a,b. In the illustrated example, the media stream offload arbiter 708 sends in the media stream offload request a peripheral interface host controller ID corresponding to the peripheral interface host controller 102a (e.g., peripheral interface host controller ID #1) or the peripheral interface host controller 102b (e.g., peripheral interface host controller ID #2) to which the detected peripheral device 106a,b is attached. To send the media stream offload request, the media stream offload arbiter 708 communicates with the host controller manager driver-to-driver interface 704 to send the media stream offload request via the peripheral media offload DDI 132.

At block 924 of the media processor manager process 904, the example media processor manager driver-to-driver interface 804 (FIG. 8) determines when the media stream offload request is received from the peripheral interface host controller manager 108. When the example media processor manager driver-to-driver interface 804 determines at block 924 that the media stream offload request has been received, the example media processor configurator 808 (FIG. 8) allocates I/O resources (block 926) to offload a media stream between the media processor 104 and the peripheral interface host controller 102a,b. For example, the media processor configurator 808 allocates the I/O resources based on the media stream offload capability of the media processor 104 and in response to receiving the media stream offload request. In the illustrated example of block 926, the media processor configurator 808 allocates a communication interface (e.g., an I/O controller 202a-c) of the media processor 104 to transfer a media stream between the media processor 104 and the peripheral interface host controller 102a,b without sending the media stream to an application processor (e.g., the processor 1012 of FIG. 10) that is in circuit with the media processor 104 and is in circuit with the peripheral interface host controller 102a,b. For example, the media processor configurator 808 queries the example I/O controller ID mapping table 304 (FIGS. 3 and 4) based on the peripheral interface host controller ID in the media stream offload request to select one of the I/O controllers 202a-c of the media processor 104 that is identified as being in circuit with the peripheral interface host controller 102a,b corresponding to the peripheral interface host controller ID. Also at block 926, the media processor configurator 808 enumerates endpoints (e.g., I/O buffers) and allocates I/O pins of the identified I/O controller 202a-c as resources for the media stream transfer.

At block 928 of the media processor manager process 904, the media stream offload request handler 806 (FIG. 8) determines whether the resource allocation was successful. If the media stream offload request handler 806 determines at block 928 that the resource allocation was not successful, the media stream offload request handler 806 sends a media stream offload response to the peripheral interface host controller manager 108 rejecting the media stream offload request (block 930). Otherwise, when the media stream offload request handler 806 determines at block 928 that the resource allocation was successful, the media stream offload request handler 806 responds to the media stream offload request by sending to the peripheral interface host controller manager 108: (1) a media stream offload response accepting the media stream offload request (block 932), and (2) the resource information indicative of the allocated resources (block 934). In some examples, the media stream offload request handler 806 sends the resource information in the media stream offload response. In the illustrated example, the media stream offload request handler 806 sends the media stream offload response and/or the resource information via the peripheral media offload DDI 132 using the media processor manager driver-to-driver interface 804.

At block 936 of the peripheral interface host controller manager process 902, the example host controller manager driver-to-driver interface 704 determines when the media stream offload response is received at the peripheral interface host controller manager 108. When the media stream offload response is received, the example media stream offload arbiter 708 determines whether the media stream offload request was accepted (block 938) by the media processor manager 110. When the media stream offload response indicates that the request was rejected, the example process of FIG. 9 ends and media stream offloading is not implemented for the peripheral device 106a,b detected at block 920. When the media stream offload response indicates that the request was accepted, the example endpoint mapper 710 (FIG. 7) generates an endpoint table entry corresponding to the peripheral device 106a,b in a corresponding endpoint mapping table 502a,b (FIGS. 5 and 6) (block 940). In the illustrated example, the endpoint table entry is programmed as described above in connection with FIGS. 5 and 6 to assign a communication interface (e.g., a corresponding one of the I/O controllers 302a,b) of the peripheral interface host controller 102a,b to transfer a media stream corresponding to the peripheral device 106a,b between the media processor 104 and the peripheral interface host controller 102a,b without the media stream being routed to an application processor (e.g., the processor 1012 of FIG. 10) that is in circuit with the peripheral interface host controller 102a,b and in circuit with the media processor 104.

The peripheral interface host controller manager 108 and the media processor manager 110 begin the offload media stream transfer. For example, at block 942 of the peripheral interface host controller manager process 902, the media stream offload arbiter 708 sends a message to the peripheral interface host controller 102a,b to begin the media stream transfer with the media processor 104 based on routing information in an endpoint table entry of a corresponding endpoint mapping table 502a,b. In addition, at block 944 of the media processor manager process 904, the media stream offload request handler 806 sends a message to the media processor 104 to begin the media stream transfer with the peripheral interface host controller 102a,b based on the resources allocated at block 926. The example processes 902 and 904 of FIG. 9 then end. The media stream can also be subsequently modified and terminated. For example, by establishing the peripheral media offload DDI 132, the offload media stream transfer between the peripheral interface host controller 102a,b and the media processor 104 can be managed by the peripheral interface host controller manager 108 and the media processor manager 110 via the peripheral media offload DDI 132, including changing properties of the media stream and terminating the media stream.

Figure 10:
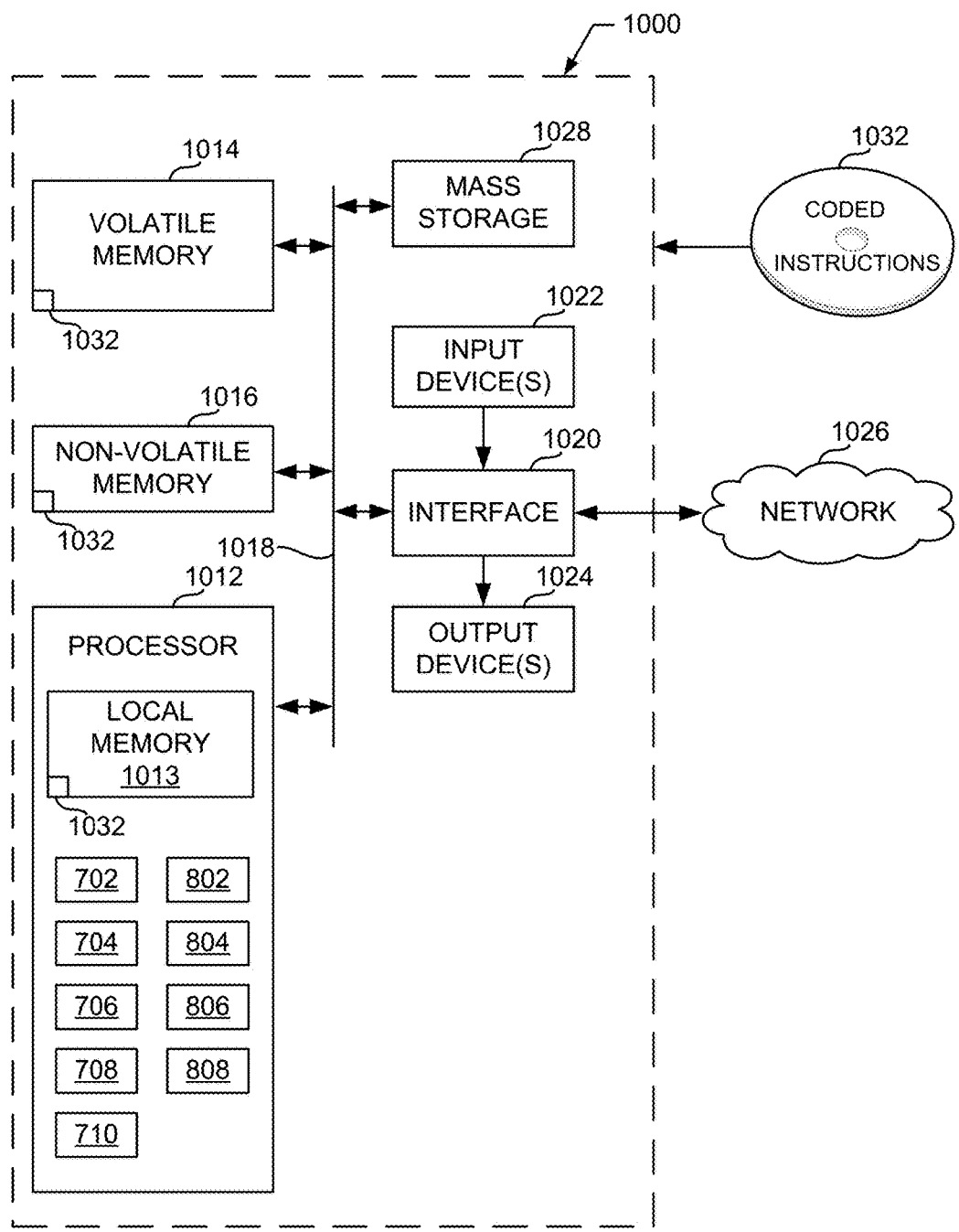
FIG. 10 is a block diagram of an example processing platform structured to execute the instructions of FIG. 9 to implement the example peripheral interface host controller manager of FIGS. 1-3, 5, and 7 and/or the example media processor manager of FIGS. 1-3, 5, and 8 to perform an offload media stream transfer.

FIG. 10 is a block diagram of an example processor platform 1000 structured to execute the instructions of FIG. 9 to implement the example peripheral interface host controller manager 108 of FIGS. 1-3, 5, and 7, and the example media processor manager 110 of FIGS. 1-3, 5, and 8. The processor platform 1000 can be, for example, a server, a personal computer, a workstation, a self-learning machine (e.g., a neural network), a mobile device (e.g., a cell phone, a smart phone, a tablet device such as an iPad™ tablet device), a personal digital assistant (PDA), an Internet appliance, a digital versatile disk (DVD) player, a compact disk (CD) player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, graphics processing units (GPUs), DSPs, or controllers from any desired family or manufacturer. The hardware processor 1012 may be a semiconductor based (e.g., silicon based) device. In the illustrated example, the processor 1012 implements an application processor that is in circuit with the peripheral interface host controllers 102a,b and in circuit with the media processor 104 of FIGS. 1-3 and 5. In this example, the processor 1012 implements the example host controller offload capability detector 702 (FIG. 7), the example host controller manager driver-to-driver interface 704 (FIG. 7), the example peripheral device detector 706 (FIG. 7), the example media stream offload arbiter 708 (FIG. 7), the example endpoint mapper 710 (FIG. 7), the example media processor offload capability detector 802 (FIG. 8), the example media processor manager driver-to-driver interface 804 (FIG. 8), the example media stream offload request handler 806 (FIG. 8), and the example media processor configurator 808 (FIG. 8).

The processor 1012 of the illustrated example includes a local memory 1013 (e.g., a cache, static random access memory (SRAM), etc.). The processor 1012 of the illustrated example is in communication with a main memory including a volatile memory 1014 and a non-volatile memory 1016 via a bus 1018. In examples disclosed herein, the volatile memory 1014 and/or the non-volatile memory 1016 may be used to implement the memory 118 of FIG. 1. The volatile memory 1014 may be implemented by Synchronous Dynamic Random Access Memory (SDRAM), Dynamic Random Access Memory (DRAM), RAMBUS® Dynamic Random Access Memory (RDRAM®), SRAM, and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes one or more example interface circuit(s) 1020. The interface circuits 1020 may be implemented by any type of interface standard, such as an Ethernet interface, a USB, a Bluetooth® interface, a near field communication (NFC) interface, and/or a PCI express interface.

In the illustrated example, one or more input devices 1022 are connected to the interface circuit(s) 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit(s) 1020 of the illustrated example. The output devices 1024 can be implemented, for example, by speakers, headphones, headsets, display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or a printer. For video/image data, the interface circuit(s) 1020 of the illustrated example implement(s) a graphics driver card, a graphics driver chip and/or a graphics driver processor. In examples disclosed herein, the interface circuit(s) 1020 implement(s) the peripheral interface host controller 102*a,b* of FIGS. 1-3 and 5. In addition, the input device(s) 1022 and/or the output device(s) 1024 implement the peripheral devices 106*a,b* of FIGS. 1-3 and 5.

The interface circuit(s) 1020 of the illustrated example also include(s) a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and DVD drives.

Machine executable instructions 1032 to implement the example processes of FIG. 9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that enable offloading media stream transfers from an application processor of a host device onto a media processor of the host device so that such transfers of media streams can be handled by media processors that are more efficient at media processing than application processors. In view of the increasing adoption of using digital media streams via USB Type-C ports for headsets, speakers, and microphones in portable computing devices, and the growing trend to decrease or discontinue the use of the legacy 3.5 mm analog audio jack by OEMs in current and future platforms, devices will rely more on digital processing of media streams. Such portable computing devices (e.g., mobile smartphones, mobile media devices, tablet computing devices, wearable computing devices (e.g., smartwatches), etc.) are battery powered and, as such, benefit from low-power operation. Examples disclosed herein are particularly useful for reducing power consumption of such portable computing devices by offloading media streams based on providing deep buffering for the data path to decrease the frequency at which the application processor, memory, and/or any other system on chip (SoC) infrastructure must be used for transferring the media streams to and from memory. In addition, examples disclosed herein further reduce power consumption of devices by offloading the processing of such media streams from application processors of host devices to lower power media processors. Since media processors are specifically designed for media processing functions, media processors are more power-efficient and time-efficient at processing media than application processors, which are designed to handle a broader variety of functionality including running operating systems, applications, user interfaces, and system control activities. As such, by offloading media stream processing to a media processor, examples disclosed herein consume relatively less power when handling media streams such as USB-based audio streams than prior techniques that process media streams using an application processor of a host device.

In addition, using media processors enables consistent media processor-based pre-processing and/or post-processing of media streams corresponding to peripheral devices, which allows manufacturers to utilize hardware acceleration-based audio processing algorithms for media coding/decoding solutions (e.g., HD-A codecs), on peripheral device-based audio streams. In addition, examples disclosed herein may be used with existing peripheral media devices without needing to make changes to such peripheral devices to employ the disclosed techniques.

The following pertain to further examples disclosed herein.

Example 1 is an apparatus to route a media stream between a media processor and a peripheral interface host controller. The apparatus of Example 1 includes: a host controller offload capability detector to determine that a media stream offload capability is available in the peripheral interface host controller; a media stream offload arbiter to send a media stream offload request to a media processor manager based on the media stream offload capability and based on a peripheral device being connected to the peripheral interface host controller; and an endpoint mapper to generate an endpoint table entry corresponding to the peripheral device, the endpoint table entry to assign a first communication interface of the peripheral interface host controller to transfer the media stream corresponding to the peripheral device between the media processor and the peripheral interface host controller.

In Example 2, the subject matter of Example 1 can optionally include that the transfer of the media stream between the media processor and the peripheral interface host controller is without the media stream being routed to an application processor that is in circuit with the peripheral interface host controller and in circuit with the media processor.

In Example 3, the subject matter of any one of Examples 1-2 can optionally include a host controller manager driver-to-driver interface to communicate control information with the media processor manager via a peripheral media offload driver-to-driver interface, the peripheral media offload driver-to-driver interface to form a control path separate from a data path, the data path to transfer the media stream between the media processor and the peripheral interface host controller.

In Example 4, the subject matter of any one of Examples 1-3 can optionally include that the endpoint mapper is further to program the endpoint table entry to map at least one of an input pin, an output pin, or a bi-directional pin of the first communication interface with a buffer of the peripheral interface host controller.

In Example 5, the subject matter of any one of Examples 1-4 can optionally include that the media stream offload capability is indicative of a capability of the peripheral interface host controller to transfer media streams between the peripheral interface host controller and the media processor while bypassing an application processor that is in circuit with the peripheral interface host controller and in circuit with the media processor.

In Example 6, the subject matter of any one of Examples 1-5 can optionally include a peripheral device detector to detect that the peripheral device is connected to the peripheral interface host controller, the media stream offload arbiter to send the media stream offload request in response to detecting that the peripheral device is connected to the peripheral interface host controller.

In Example 7, the subject matter of any one of Examples 1-6 can optionally include that the peripheral interface host controller is a universal serial bus (USB) host controller.

Example 8 is an apparatus to route a media stream between a media processor and a peripheral interface host controller. The apparatus of Example 8 includes: means for detecting a media stream offload capability of the peripheral interface host controller; means for sending a media stream offload request to a media processor manager based on the media stream offload capability and based on a peripheral device being connected to the peripheral interface host controller; and means for generating an endpoint table entry corresponding to the peripheral device, the endpoint table entry to assign a first communication interface of the peripheral interface host controller to transfer the media stream corresponding to the peripheral device between the media processor and the peripheral interface host controller.

In Example 9, the subject matter of Example 8 can optionally include that the transfer of the media stream between the media processor and the peripheral interface host controller is without the media stream being routed to an application processor that is in circuit with the peripheral interface host controller and in circuit with the media processor.

In Example 10, the subject matter of any one of Examples 8-9 can optionally include means for communicating control information with the media processor manager via a peripheral media offload driver-to-driver interface, the peripheral media offload driver-to-driver interface to form a control path separate from a data path, the data path to transfer the media stream between the media processor and the peripheral interface host controller.

In Example 11, the subject matter of any one of Examples 8-10 can optionally include that the means for generating the endpoint table entry is to program the endpoint table entry to map at least one of an input pin, an output pin, or a bi-directional pin of the first communication interface with a buffer of the peripheral interface host controller.

In Example 12, the subject matter of any one of Examples 8-11 can optionally include that the media stream offload capability is indicative of a capability of the peripheral interface host controller to transfer media streams between the peripheral interface host controller and the media processor while bypassing an application processor that is in circuit with the peripheral interface host controller and in circuit with the media processor.

In Example 13, the subject matter of any one of Examples 8-12 can optionally include means for detecting that the peripheral device is connected to the peripheral interface host controller, the means for sending the media stream offload request to send the media offload request in response to the detecting that the peripheral device is connected to the peripheral interface host controller.

In Example 14, the subject matter of any one of Examples 8-13 can optionally include that the peripheral interface host controller is a universal serial bus (USB) host controller.

Example 15 is a non-transitory computer readable storage medium including instructions that, when executed, cause at least one processor to at least: detect a media stream offload capability of a peripheral interface host controller; send a media stream offload request to a media processor manager based on the media stream offload capability and based on a peripheral device being connected to the peripheral interface host controller; and generate an endpoint table entry corresponding to the peripheral device, the endpoint table entry to assign a first communication interface of the peripheral interface host controller to transfer a media stream corresponding to the peripheral device between a media processor and the peripheral interface host controller.

In Example 16, the subject matter of Example 15 can optionally include that the transfer of the media stream between the media processor and the peripheral interface host controller is without the media stream being routed to an application processor that is in circuit with the peripheral interface host controller and in circuit with the media processor.

In Example 17, the subject matter of any one of Examples 15-16 can optionally include that the instructions are further to cause the at least one processor to communicate control information with the media processor manager via a peripheral media offload driver-to-driver interface, the peripheral media offload driver-to-driver interface to form a control path separate from a data path, the data path to transfer the media stream between the media processor and the peripheral interface host controller.

In Example 18, the subject matter of any one of Examples 15-17 can optionally include that the instructions are further to cause the at least one processor to program the endpoint table entry to map at least one of an input pin, an output pin, or a bi-directional pin of the first communication interface with a buffer of the peripheral interface host controller.

In Example 19, the subject matter of any one of Examples 15-18 can optionally include that the media stream offload capability is indicative of a capability of the peripheral interface host controller to transfer media streams between the peripheral interface host controller and the media processor while bypassing an application processor that is in circuit with the peripheral interface host controller and in circuit with the media processor.

In Example 20, the subject matter of any one of Examples 15-19 can optionally include that the instructions are further to cause the at least one processor to detect that the peripheral device is connected to the peripheral interface host controller, the instructions to cause the at least one processor to send the media stream offload request in response to the at least one processor detecting that the peripheral device is connected to the peripheral interface host controller.

In Example 21, the subject matter of any one of Examples 15-20 can optionally include that the peripheral interface host controller is a universal serial bus (USB) host controller.

Example 22 is a method to route a media stream between a media processor and a peripheral interface host controller. The method of Example 22 includes: detecting a media stream offload capability of the peripheral interface host controller; sending a media stream offload request to a media processor manager based on the media stream offload capability and based on a peripheral device being connected to the peripheral interface host controller; and generating an endpoint table entry corresponding to the peripheral device, the endpoint table entry to assign a first communication interface of the peripheral interface host controller to transfer the media stream corresponding to the peripheral device between the media processor and the peripheral interface host controller.

In Example 23, the subject matter of Example 22 can optionally include that the transfer of the media stream between the media processor and the peripheral interface host controller is without the media stream being routed to an application processor that is in circuit with the peripheral interface host controller and in circuit with the media processor.

In Example 24, the subject matter of any one of Examples 22-23 can optionally include communicating control information with the media processor manager via a peripheral media offload driver-to-driver interface, the peripheral media offload driver-to-driver interface to form a control path separate from a data path, the data path to transfer the media stream between the media processor and the peripheral interface host controller.

In Example 25, the subject matter of any one of Examples 22-24 can optionally include programming the endpoint table entry to map at least one of an input pin, an output pin, or a bi-directional pin of the first communication interface with a buffer of the peripheral interface host controller.

In Example 26, the subject matter of any one of Examples 22-25 can optionally include that the media stream offload capability is indicative of a capability of the peripheral interface host controller to transfer media streams between the peripheral interface host controller and the media processor while bypassing an application processor that is in circuit with the peripheral interface host controller and in circuit with the media processor.

In Example 27, the subject matter of any one of Examples 22-26 can optionally include detecting that the peripheral device is connected to the peripheral interface host controller, the sending of the media stream offload request being in response to the detecting that the peripheral device is connected to the peripheral interface host controller.

In Example 28, the subject matter of any one of Examples 22-27 can optionally include that the peripheral interface host controller is a universal serial bus (USB) host controller.

Example 29 is an apparatus to route a media stream between a media processor and a peripheral interface host controller. The apparatus of Example 29 includes: a media processor offload capability detector to determine that a media stream offload capability is available in the media processor; a media processor configurator to, based on the media stream offload capability and in response to a media stream offload request received from a peripheral interface host controller manager, allocate a communication interface of the media processor to transfer the media stream between the media processor and the peripheral interface host controller; and a media stream offload request handler to send resource information corresponding to the communication interface to the peripheral interface host controller manager in response to the media stream offload request.

In Example 30, the subject matter of Example 29 can optionally include that the transfer of the media stream between the media processor and the peripheral interface host controller is without sending the media stream to an application processor that is in circuit with the media processor and is in circuit with the peripheral interface host controller.

In Example 31, the subject matter of any one of Examples 29-30 can optionally include a media processor manager driver-to-driver interface to communicate control information with the peripheral interface host controller manager via a peripheral media offload driver-to-driver interface, the peripheral media offload driver-to-driver interface to form a control path separate from a data path used to transfer the media stream between the media processor and the peripheral interface host controller.

In Example 32, the subject matter of any one of Examples 29-31 can optionally include that the media stream offload request handler is to receive the media stream offload request from the peripheral interface host controller when a peripheral media device is connected to the peripheral interface host controller.

In Example 33, the subject matter of any one of Examples 29-32 can optionally include that the media stream offload capability is indicative of a capability of the media processor to transfer media streams between the peripheral interface host controller and the media processor while bypassing an application processor that is in circuit with the media processor and is in circuit with the peripheral interface host controller.

In Example 34, the subject matter of any one of Examples 29-33 can optionally include that the media processor configurator is to query an input/output controller identifier mapping table based on a peripheral interface host controller identifier in the media stream offload request to determine the communication interface of the media processor to allocate to transfer the media stream between the media processor and the peripheral interface host controller.

In Example 35, the subject matter of any one of Examples 29-34 can optionally include that the peripheral interface host controller is a universal serial bus (USB) host controller.

Example 36 is an apparatus to route a media stream between a media processor and a peripheral interface host controller. The apparatus of Example 36 includes: means for detecting a media stream offload capability of the media processor; means for allocating a communication interface of the media processor based on the media stream offload capability and in response to a media stream offload request received from a peripheral interface host controller manager, the communication interface of the media processor to transfer the media stream between the media processor and the peripheral interface host controller; and means for sending a media stream offload response to the peripheral interface host controller manager in response to the media stream offload request, the media stream offload response to include resource information corresponding to the communication interface.

In Example 37, the subject matter of Example 36 can optionally include that the transfer of the media stream between the media processor and the peripheral interface host controller is without sending the media stream to an application processor that is in circuit with the media processor and is in circuit with the peripheral interface host controller.

In Example 38, the subject matter of any one of Examples 36-37 can optionally include means for communicating control information with the peripheral interface host controller manager via a peripheral media offload driver-to-driver interface, the peripheral media offload driver-to-driver interface to form a control path separate from a data path used to transfer the media stream between the media processor and the peripheral interface host controller.

In Example 39, the subject matter of any one of Examples 36-38 can optionally include that the means for sending the media stream offload response is to receive the media stream offload request from the peripheral interface host controller when a peripheral device is connected to the peripheral interface host controller.

In Example 40, the subject matter of any one of Examples 36-39 can optionally include that the media stream offload capability is indicative of a capability of the media processor to transfer media streams between the peripheral interface host controller and the media processor while bypassing an application processor that is in circuit with the media processor and is in circuit with the peripheral interface host controller.

In Example 41, the subject matter of any one of Examples 36-40 can optionally that the means for allocating the communication interface of the media processor is to query an input/output controller identifier mapping table based on a peripheral interface host controller identifier in the media stream offload request to determine the communication interface of the media processor to allocate to transfer the media stream between the media processor and the peripheral interface host controller.

In Example 42, the subject matter of any one of Examples 36-41 can optionally include that the peripheral interface host controller is a universal serial bus (USB) host controller.

Example 43 is a non-transitory computer readable storage medium including instructions that, when executed, cause at least one processor to at least: detect a media stream offload capability of a media processor; allocate a communication interface of the media processor based on the media stream offload capability and in response to a media stream offload request received from a peripheral interface host controller manager, the communication interface of the media processor to transfer the media stream between the media processor and a peripheral interface host controller; and send a media stream offload response to the peripheral interface host controller manager in response to the media stream offload request, the media stream offload response to include resource information corresponding to the communication interface.

In Example 44, the subject matter of Example 43 can optionally include that the transfer of the media stream between the media processor and the peripheral interface host controller is without sending the media stream to an application processor that is in circuit with the media processor and is in circuit with the peripheral interface host controller.

In Example 45, the subject matter of any one of Examples 43-44 can optionally include that the instructions are further to cause the at least one processor to communicate control information with the peripheral interface host controller manager via a peripheral media offload driver-to-driver interface, the peripheral media offload driver-to-driver interface to form a control path separate from a data path used to transfer the media stream between the media processor and the peripheral interface host controller.

In Example 46, the subject matter of any one of Examples 43-45 can optionally include that the instructions are further to cause the at least one processor to receive the media stream offload request from the peripheral interface host controller when a peripheral device is connected to the peripheral interface host controller.

In Example 47, the subject matter of any one of Examples 43-46 can optionally include that the media stream offload capability is indicative of a capability of the media processor to transfer media streams between the peripheral interface host controller and the media processor while bypassing an application processor that is in circuit with the media processor and is in circuit with the peripheral interface host controller.

In Example 48, the subject matter of any one of Examples 43-47 can optionally include that the instructions are further to cause the at least one processor to query an input/output controller identifier mapping table based on a peripheral interface host controller identifier in the media stream offload request to determine the communication interface of the media processor to allocate to transfer the media stream between the media processor and the peripheral interface host controller.

In Example 49, the subject matter of any one of Examples 43-48 can optionally include that the peripheral interface host controller is a universal serial bus (USB) host controller.

Example 50 is a method to route a media stream between a media processor and a peripheral interface host controller. The method of Example 50 includes: detecting a media stream offload capability of the media processor; allocating a communication interface of the media processor based on the media stream offload capability and in response to a media stream offload request received from a peripheral interface host controller manager, the communication interface of the media processor to transfer the media stream between the media processor and the peripheral interface host controller; and sending a media stream offload response to the peripheral interface host controller manager in response to the media stream offload request, the media stream offload response to include resource information corresponding to the communication interface.

In Example 51, the subject matter of Example 50 can optionally include that the transfer of the media stream between the media processor and the peripheral interface host controller is without sending the media stream to an application processor that is in circuit with the media processor and is in circuit with the peripheral interface host controller.

In Example 52, the subject matter of any one of Examples 50-51 can optionally include communicating control information with the peripheral interface host controller manager via a peripheral media offload driver-to-driver interface, the peripheral media offload driver-to-driver interface to form a control path separate from a data path used to transfer the media stream between the media processor and the peripheral interface host controller.

In Example 53, the subject matter of any one of Examples 50-52 can optionally include receiving the media stream offload request from the peripheral interface host controller when a peripheral device is connected to the peripheral interface host controller.

In Example 54, the subject matter of any one of Examples 50-53 can optionally include that the media stream offload capability is indicative of a capability of the media processor to transfer media streams between the peripheral interface host controller and the media processor while bypassing an application processor that is in circuit with the media processor and is in circuit with the peripheral interface host controller.

In Example 55, the subject matter of any one of Examples 50-54 can optionally include querying an input/output controller identifier mapping table based on a peripheral interface host controller identifier in the media stream offload request to determine the communication interface of the media processor to allocate to transfer the media stream between the media processor and the peripheral interface host controller.

In Example 56, the subject matter of any one of Examples 50-55 can optionally include that the peripheral interface host controller is a universal serial bus (USB) host controller.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to route a media stream between a media processor and a peripheral interface host controller, the apparatus comprising:
   a host controller offload capability detector to determine that a media stream offload capability is available in the peripheral interface host controller;
   a media stream offload arbiter to send a media stream offload request to a media processor manager based on the media stream offload capability and based on a peripheral device being connected to the peripheral interface host controller; and
   an endpoint mapper to generate an endpoint table entry corresponding to the peripheral device, the endpoint table entry to assign a first communication interface of the peripheral interface host controller to transfer the media stream corresponding to the peripheral device between the media processor and the peripheral interface host controller.

2. The apparatus as defined in claim 1, wherein the transfer of the media stream between the media processor and the peripheral interface host controller is without the media stream being routed to an application processor that is in circuit with the peripheral interface host controller and in circuit with the media processor.

3. The apparatus as defined in claim 1, further including a host controller manager driver-to-driver interface to communicate control information with the media processor manager via a peripheral media offload driver-to-driver interface, the peripheral media offload driver-to-driver interface to form a control path separate from a data path, the data path to transfer the media stream between the media processor and the peripheral interface host controller.

4. The apparatus as defined in claim 1, wherein the endpoint mapper is further to program the endpoint table entry to map at least one of an input pin, an output pin, or a bi-directional pin of the first communication interface with a buffer of the peripheral interface host controller.

5. The apparatus as defined in claim 1, wherein the media stream offload capability is indicative of a capability of the peripheral interface host controller to transfer media streams between the peripheral interface host controller and the media processor while bypassing an application processor that is in circuit with the peripheral interface host controller and in circuit with the media processor.

6. The apparatus as defined in claim 1, further including a peripheral device detector to detect that the peripheral device is connected to the peripheral interface host controller, the media stream offload arbiter to send the media stream offload request in response to detecting that the peripheral device is connected to the peripheral interface host controller.

7. The apparatus as defined in claim 1, wherein the peripheral interface host controller is a universal serial bus (USB) host controller.

8. An apparatus to route a media stream between a media processor and a peripheral interface host controller, the apparatus comprising:
   means for detecting a media stream offload capability of the peripheral interface host controller;
   means for sending a media stream offload request to a media processor manager based on the media stream offload capability and based on a peripheral device being connected to the peripheral interface host controller; and
   means for generating an endpoint table entry corresponding to the peripheral device, the endpoint table entry to assign a first communication interface of the peripheral interface host controller to transfer the media stream corresponding to the peripheral device between the media processor and the peripheral interface host controller.

9. The apparatus as defined in claim 8, wherein the transfer of the media stream between the media processor and the peripheral interface host controller is without the media stream being routed to an application processor that is in circuit with the peripheral interface host controller and in circuit with the media processor.

10. The apparatus as defined in claim 8, further including means for communicating control information with the media processor manager via a peripheral media offload driver-to-driver interface, the peripheral media offload driver-to-driver interface to form a control path separate from a data path, the data path to transfer the media stream between the media processor and the peripheral interface host controller.

11. The apparatus as defined in claim 8, wherein the means for generating the endpoint table entry is to program the endpoint table entry to map at least one of an input pin, an output pin, or a bi-directional pin of the first communication interface with a buffer of the peripheral interface host controller.

12. The apparatus as defined in claim 8, wherein the media stream offload capability is indicative of a capability of the peripheral interface host controller to transfer media streams between the peripheral interface host controller and the media processor while bypassing an application processor that is in circuit with the peripheral interface host controller and in circuit with the media processor.

13. The apparatus as defined in claim 8, further including means for detecting that the peripheral device is connected to the peripheral interface host controller, the means for sending the media stream offload request to send the media offload request in response to the detecting that the peripheral device is connected to the peripheral interface host controller.

14. The apparatus as defined in claim 8, wherein the peripheral interface host controller is a universal serial bus (USB) host controller.

15. A non-transitory computer readable storage medium comprising instructions that, when executed, cause at least one processor to at least:
- detect a media stream offload capability of a peripheral interface host controller;
- send a media stream offload request to a media processor manager based on the media stream offload capability and based on a peripheral device being connected to the peripheral interface host controller; and
- generate an endpoint table entry corresponding to the peripheral device, the endpoint table entry to assign a first communication interface of the peripheral interface host controller to transfer a media stream corresponding to the peripheral device between a media processor and the peripheral interface host controller.

16. The non-transitory computer readable storage medium as defined in claim 15, wherein the transfer of the media stream between the media processor and the peripheral interface host controller is without the media stream being routed to an application processor that is in circuit with the peripheral interface host controller and in circuit with the media processor.

17. The non-transitory computer readable storage medium as defined in claim 15, wherein the instructions are further to cause the at least one processor to communicate control information with the media processor manager via a peripheral media offload driver-to-driver interface, the peripheral media offload driver-to-driver interface to form a control path separate from a data path, the data path to transfer the media stream between the media processor and the peripheral interface host controller.

18. The non-transitory computer readable storage medium as defined in claim 15, wherein the instructions are further to cause the at least one processor to program the endpoint table entry to map at least one of an input pin, an output pin, or a bi-directional pin of the first communication interface with a buffer of the peripheral interface host controller.

19. The non-transitory computer readable storage medium as defined in claim 15, wherein the media stream offload capability is indicative of a capability of the peripheral interface host controller to transfer media streams between the peripheral interface host controller and the media processor while bypassing an application processor that is in circuit with the peripheral interface host controller and in circuit with the media processor.

20. The non-transitory computer readable storage medium as defined in claim 15, wherein the instructions are further to cause the at least one processor to detect that the peripheral device is connected to the peripheral interface host controller, the instructions to cause the at least one processor to send the media stream offload request in response to the at least one processor detecting that the peripheral device is connected to the peripheral interface host controller.

21. The non-transitory computer readable storage medium as defined in claim 15, wherein the peripheral interface host controller is a universal serial bus (USB) host controller.

22. A method to route a media stream between a media processor and a peripheral interface host controller, the method comprising:
- detecting a media stream offload capability of the peripheral interface host controller;
- sending a media stream offload request to a media processor manager based on the media stream offload capability and based on a peripheral device being connected to the peripheral interface host controller; and
- generating an endpoint table entry corresponding to the peripheral device, the endpoint table entry to assign a first communication interface of the peripheral interface host controller to transfer the media stream corresponding to the peripheral device between the media processor and the peripheral interface host controller.

23. The method as defined in claim 22, wherein the transfer of the media stream between the media processor and the peripheral interface host controller is without the media stream being routed to an application processor that is in circuit with the peripheral interface host controller and in circuit with the media processor.

24. The method as defined in claim 22, further including communicating control information with the media processor manager via a peripheral media offload driver-to-driver interface, the peripheral media offload driver-to-driver interface to form a control path separate from a data path, the data path to transfer the media stream between the media processor and the peripheral interface host controller.

25. The method as defined in claim 22, further including programming the endpoint table entry to map at least one of an input pin, an output pin, or a bi-directional pin of the first communication interface with a buffer of the peripheral interface host controller.

* * * * *